(12) United States Patent
Niver et al.

(10) Patent No.: US 8,085,794 B1
(45) Date of Patent: Dec. 27, 2011

(54) TECHNIQUES FOR FAULT TOLERANT ROUTING IN A DESTINATION-ROUTED SWITCH FABRIC

(75) Inventors: Brett D. Niver, Grafton, MA (US); William F. Baxter, III, Holliston, MA (US); Steven R. Chalmer, Auburndale, MA (US)

(73) Assignee: EMC Corporation, Hopkinton, MA (US)

( * ) Notice: Subject to any disclaimer, the term of this patent is extended or adjusted under 35 U.S.C. 154(b) by 734 days.

(21) Appl. No.: 11/454,739

(22) Filed: Jun. 16, 2006

(51) Int. Cl.
 *H04L 12/56* (2006.01)
(52) U.S. Cl. .................................................. 370/401
(58) Field of Classification Search ............... 370/217, 370/237, 400, 216, 252, 389, 230, 238; 709/242; 714/43
 See application file for complete search history.

(56) References Cited

U.S. PATENT DOCUMENTS

| | | | | |
|---|---|---|---|---|
| 5,243,592 | A * | 9/1993 | Perlman et al. ............... | 370/252 |
| 5,598,568 | A | 1/1997 | Frisch | |
| 5,721,828 | A | 2/1998 | Frisch | |
| 6,678,773 | B2 | 1/2004 | Marietta et al. | |
| 6,909,695 | B2 * | 6/2005 | Lee et al. ....................... | 370/238 |
| 6,918,063 | B2 * | 7/2005 | Ho et al. ........................ | 714/43 |
| 6,925,056 | B1 | 8/2005 | Lee ................................ | 370/230 |
| 6,999,459 | B1 * | 2/2006 | Callon et al. .................. | 370/400 |
| 7,020,076 | B1 * | 3/2006 | Alkalai et al. ................. | 370/217 |
| 7,031,258 | B1 | 4/2006 | Frisch et al. | |
| 7,106,742 | B1 | 9/2006 | Frisch et al. | |
| 7,155,536 | B2 * | 12/2006 | Mongazon-Cazavet et al. ............................. | 709/242 |
| 7,362,709 | B1 * | 4/2008 | Hui et al. ....................... | 370/237 |
| 7,428,209 | B1 * | 9/2008 | Roberts .......................... | 370/217 |
| 2002/0165981 | A1 * | 11/2002 | Basturk et al. ................ | 709/242 |
| 2004/0136324 | A1 * | 7/2004 | Steinberg et al. ............. | 370/238 |
| 2004/0236720 | A1 * | 11/2004 | Basso et al. ................... | 707/1 |
| 2005/0185645 | A1 * | 8/2005 | Seppanen ...................... | 370/389 |
| 2005/0265255 | A1 * | 12/2005 | Kodialam et al. ............. | 370/252 |
| 2005/0270972 | A1 * | 12/2005 | Kodialam et al. ............. | 370/216 |

OTHER PUBLICATIONS (Web page publication)www.scit.wlv.ac.uk/%7Ejphb/comms/routing.html. No date or author indicated. 11 pages.
(Web page publication from www.mc.com) "RACE++Series RACEway Interlink Modules", Mercury Computer Systems, Copyright 1999.
(Web page publication from www.mc.com) RACEWAY Interlink Functional Specification, Mercury Computer Systems, Nov. 8, 2000.

\* cited by examiner

*Primary Examiner* — Yong Zhou
(74) *Attorney, Agent, or Firm* — Muirhead and Saturnelli, LLC

(57) ABSTRACT

Described are techniques for determining a set of routing information for a plurality of components performing routing in a network. Destinations that are directly connected to each of the plurality of components are determined. Each of the plurality of components is associated with one of a plurality of routing tables. Each of the plurality of routing tables stores routing information in accordance with destinations in the network. Cost information is stored in the plurality of routing tables for each destination directly connected to one of the plurality of components. For each of the plurality of components, a set of neighboring components is determined. For each neighboring component, routing information for a destination is adopted from the routing table of said each neighboring component in accordance with an adoption rule. Processing is repeatedly performed until the routing tables have not been modified.

20 Claims, 22 Drawing Sheets

Switch A (400)

| Distance | Destination | Port |
|---|---|---|
| 2 | 4 | P2 |
| 2 | 3 | P1 |
| 2 | 2 | P3 |
| 1 | 1 | P0 |

Switch B

| Distance | Destination | Port |
|---|---|---|
| ~~3~~ 2 | 4 | ~~P0~~ P2 — 410 |
| 1 | 3 | P1 |
| ~~X~~ 2 | 2 | ~~P0~~ P3 — 412 |
| 2 | 1 | P0 |

Switch C

| Distance | Destination | Port |
|---|---|---|
|  | 4 |  |
|  | 3 |  |
| 1 | 2 | P0 |
|  | 1 |  |

Switch D

| Distance | Destination | Port |
|---|---|---|
| 1 | 4 | P3 |
|  | 3 |  |
|  | 2 |  |
|  | 1 |  |

FIGURE 9

TECHNIQUES FOR FAULT TOLERANT ROUTING IN A DESTINATION-ROUTED SWITCH FABRIC

BACKGROUND

1. Technical Field

This application generally relates to routing, and more particularly to fault tolerant routing techniques.

2. Description of Related Art

Messages may be communicated between different components in one or more networks of varying topologies using a switch fabric. The switch fabric may include one or more switches and other components arranged to permit transmissions of messages between different components or endpoints. Messages may also be referred to as frames and may include a header portion and a payload, such as data.

Different techniques may be used in connection with routing a message at each juncture, such as by a switch, from a source to a destination endpoint. One technique may be referred to as destination routing in which the destination is used by each switch to make routing decisions such as in connection with a packet-switched fabric. The switches may perform static routing using preconfigured information included in a routing table. The routing tables contain information mappings established by the network administrator before the beginning of routing. These mappings do not change unless the network administrator alters them.

One drawback with using static routing techniques occurs when there is a problem with a link used for one or more paths between a source and destination. With static routing, any designated routes through a down connection fail. Static routing is not able to adjust to the foregoing or other changes in a network without adjustments to the static routing tables. Because static routing techniques cannot react to network changes, dynamic routing techniques may be used which adjust to changing network circumstances by analyzing incoming routing update messages. If the message indicates that a network change has occurred, the routing software can recalculate routes and send out new routing update messages. These network update messages permeate the network, stimulating routers to rerun their algorithms and change their routing tables accordingly. However, dynamic routing techniques may not be appropriate or desirable for one or more reasons related to the added complexity and interaction between routers in order to obtain up to date information about network traffic and topology. Additionally, dynamic routing determinations, for example due to a down connection, that select a routing alternative take an amount of time to perform the selection processing and make effective an alternative route. During this amount of time until the alternative is made effective, transmissions designated to use the down connection will still fail.

SUMMARY OF THE INVENTION

In accordance with one aspect of the invention is a method for determining a set of routing information for a plurality of components performing routing in a network comprising: determining which destinations are directly connected to each of said plurality of components, wherein each of said plurality of components is associated with one of a plurality of routing tables, each of said plurality of routing tables storing routing information in accordance with destinations in said network; storing, in accordance with said determining, cost information in said plurality of routing tables for each destination directly connected to one of said plurality of components; performing, for each of said plurality of components: determining a set of neighboring components; and for each neighboring component, adopting routing information for a destination from the routing table of said each neighboring component in accordance with an adoption rule; and determining whether routing information in said plurality of routing tables has been modified, wherein said performing is repeated until said plurality of routing tables has not been modified as a result of said performing. The adoption rule may include at least a first criterion indicating that first routing information for a first destination from said each neighboring component's routing table is adopted if the first routing information specifies a first path from said each component to said first destination having a first cost that is lower than a current cost associated with a second path from said each component to said first destination using second routing information for said first destination included in a routing table associated with said each component. The cost may be associated with path length. The routing table that may be associated with said each component includes one or more paths from said each component to said first destination, and said adoption rule may include a second criterion indicating that said first routing information from said each neighboring component's routing table is adopted if the first routing information specifies a new path from said each component to said first destination. The method may be executed for determining each of a plurality of different sets of routing information, each of said sets of routing information being associated with a path from said each component to said first destination. The cost may be associated with one or more characteristics including at least one of: bandwidth, latency, transmission error-rate, load balancing, link failure, and component failure.

In accordance with another aspect of the invention is a method for routing a received transmission at a component performing routing comprising: determining, in accordance with static routing information, one or more sets of routing information for routing said received transmission; selecting, in accordance with selection criteria, a first of said one or more sets of routing information; and routing said received transmission using said first set of routing information. The component may be a switch. The selection criteria may include use of one or more selection bits included in said received transmission. The selection bits may include encoded information indicating one of a plurality of conditions, said plurality of conditions including one or more of: perform routing using said first set of routing information, perform routing using routing information other than said first set, and randomly select a set of routing information. The selecting may be performed using at least one dynamic input that changes over time in accordance with said component or other characteristic of said network. The selection criteria may be used said component to make an adaptive routing decision regarding said received transmission. The dynamic input may indicate a transmission problem associated with a path specified by said one or more sets of routing information for said received transmission, and said selecting selects another path specified by said one or more sets of routing information.

In accordance with another aspect of the invention is a computer readable medium comprising code for determining a set of routing information for a plurality of components performing routing in a network, the computer-readable medium comprising code for: determining which destinations are directly connected to each of said plurality of components, wherein each of said plurality of components is associated with one of a plurality of routing tables, each of said plurality of routing tables storing routing information in accordance with destinations in said network; storing, in accordance with said determining, cost information in said plurality of routing tables for each destination directly connected to one of said plurality of components; performing, for each of said plurality of components: determining a set of neighboring components; and for each neighboring component, adopting routing information for a destination from the routing table of said each neighboring component in accordance with an adoption rule; and determining whether routing information in said plurality of routing tables has been modified, wherein said performing is repeated until said plurality of routing tables has not been modified as a result of said performing. The adoption rule may include at least a first criterion indicating that first routing information for a first destination from said each neighboring component's routing table is adopted if the first routing information specifies a first path from said each component to said first destination having a first cost that is lower than a current cost associated with a second path from said each component to said first destination using second routing information for said first destination included in a routing table associated with said each component. The cost may be associated with path length. The routing table associated with said each component may include one or more paths from said each component to said first destination, and said adoption rule may include a second criterion indicating that said first routing information from said each neighboring component's routing table is adopted if the first routing information specifies a new path from said each component to said first destination. The code stored thereon may be executed for determining each of a plurality of different sets of routing information, each of said sets of routing information being associated with a path from said each component to said first destination. The cost may be associated with one or more characteristics including at least one of: bandwidth, latency, transmission error-rate, load balancing, link failure, and component failure. The component may be a switch.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5-12 are representations of routing information used in connection with an example illustrating the techniques described herein;

DETAILED DESCRIPTION OF EMBODIMENT(S)

Figure 1:
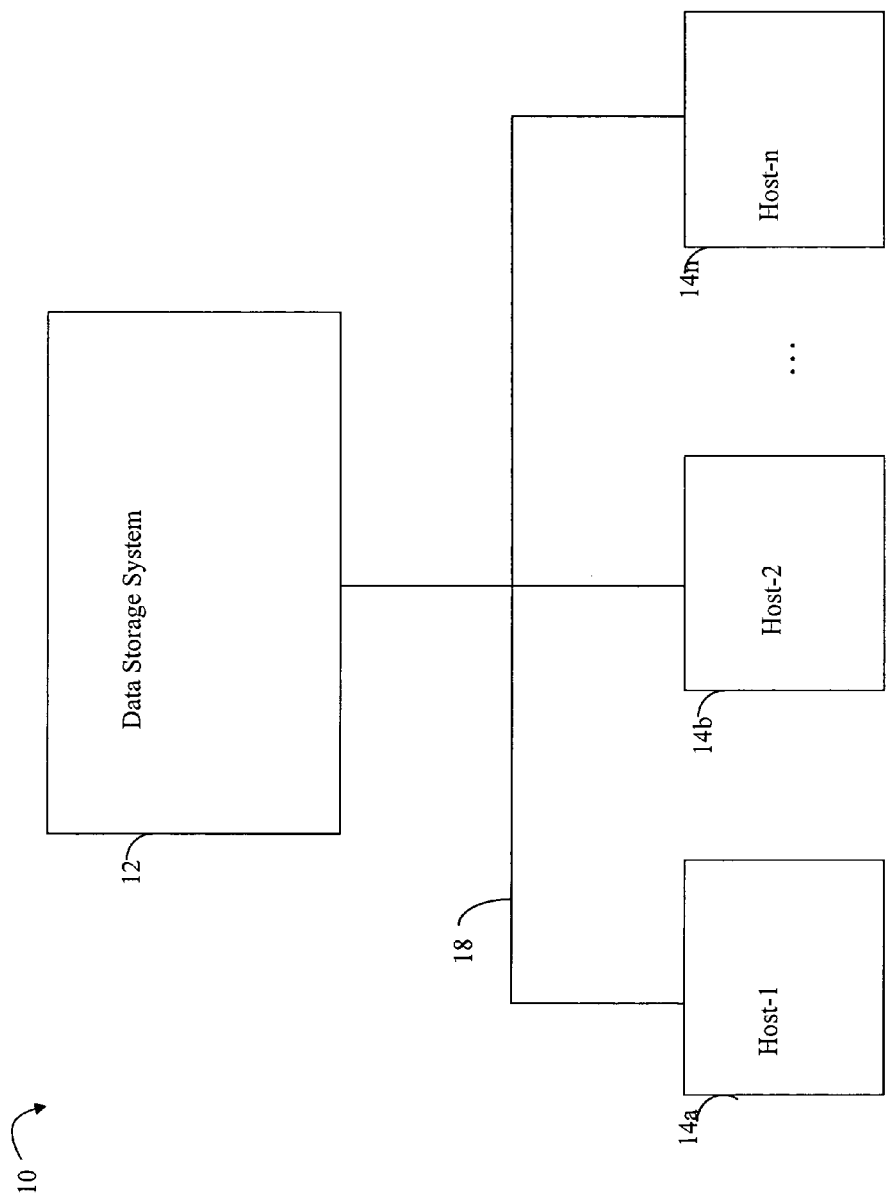
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
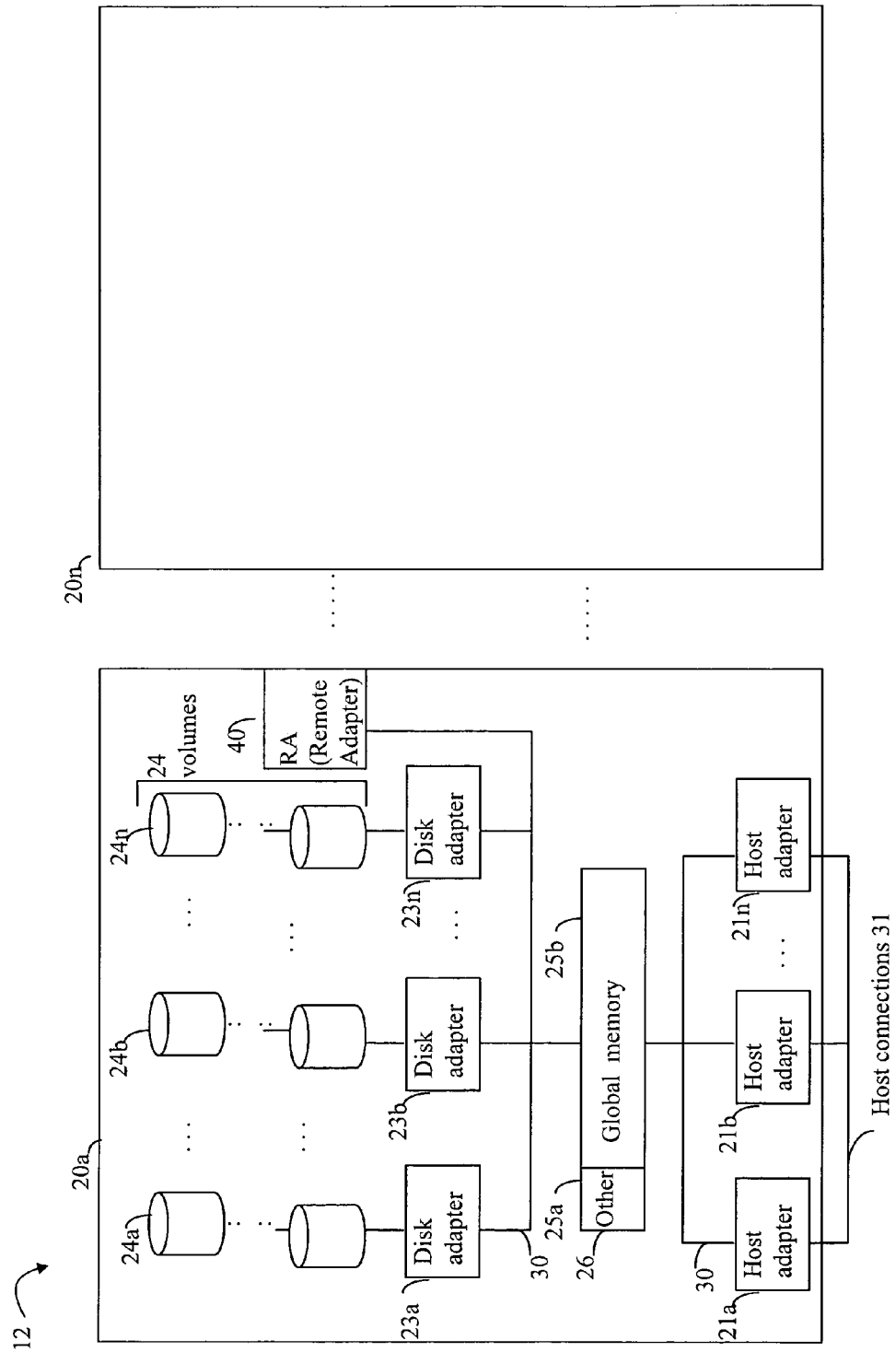
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
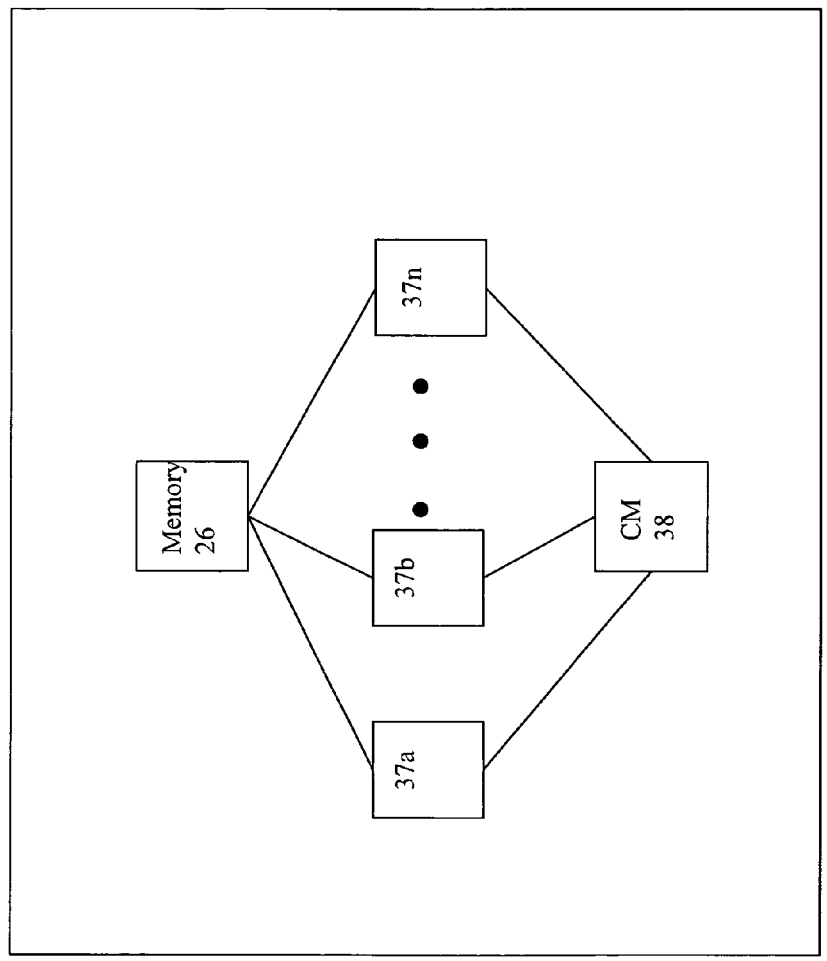
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
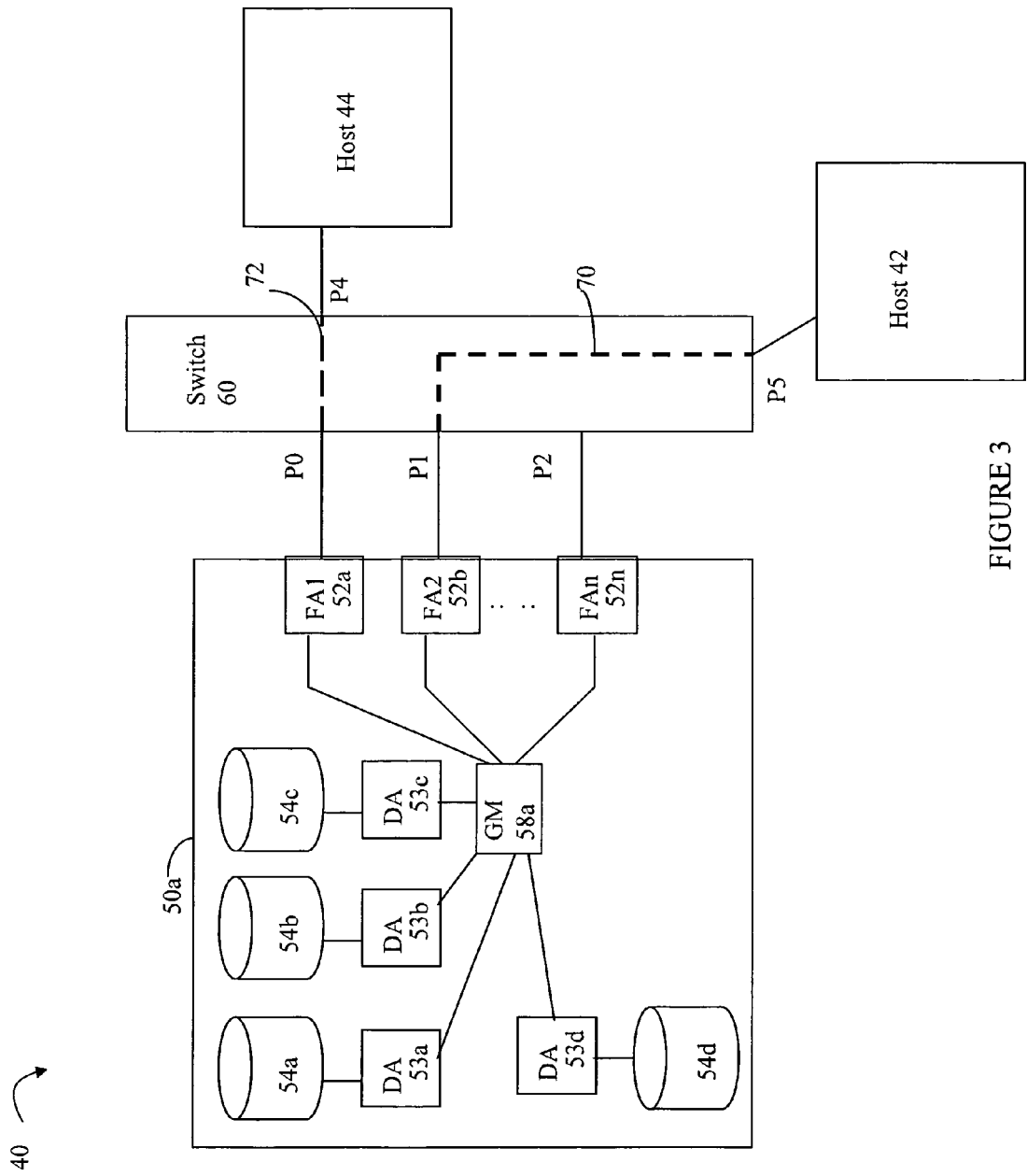
FIG. 3 is a more detailed example of an embodiment of a computer system that may utilize the techniques described herein.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage system 50a for the sake of illustration.

Included in the system 40 is data storage system 50a, a switch 60 and hosts 42 and 44. The data storage system 50a and the hosts 42,44 may communicate using switch 60. In this example, the data storage system 50a includes computer readable storage media, such as data storage devices 54a-54d, DAs 53a-53d, global memory (GM) 58a, and multiple Fibre Channel Adapters (FAs) 52a-52n. Each of the FAs 52a-52n has a Fibre Channel connection to the switch 60 to facilitate communications with the hosts 42,44. For example, the host 42 may issue a command in the form of one or more messages to data storage system 50a through switch 60 over path 70 to one of the FAs 52a-52n. Similarly, the switch 60 may be used to communicate messages from the data storage system 50a to the host. In one embodiment, the switch 60 may be an 8 port switch although a switch used in connection with the techniques herein may include any number of ports. In the example 40, 5 of the available ports are illustrated and labeled (e.g., P0, P1, P2, P3, P4, and P5).

The switch 60 routes an incoming packet at one of its ports to one of the switch's outgoing ports. For example, the switch 60 performs processing to route an input from host 44 at switch port P4 as an output of switch port P0. Similarly, the switch 60 performs processing to route an input at port P5 from host 42 as an output of port P1. What will be described in following paragraphs herein are techniques that may be used in connection with routing as performed by the switch 60 in this example. Messages may be communicated between different components in one or more networks of varying topologies using a switch fabric. The switch fabric may include one or more switches, such as switch 60, arranged to permit transmissions of messages between different components or endpoints.

Different techniques may be used in connection with routing a message at each juncture, such as by a switch, from a source to a destination endpoint. One technique may be referred to as destination-based routing in which the destination is used by each switch to make routing decisions such as in routing packets in a packet-switched fabric. The switches may perform static routing using preconfigured information included in a routing table. The routing tables contain information mappings established by the network administrator before the beginning of routing. These mappings do not change unless the network administrator alters them. In one embodiment as will be described herein, the switch 60 may be one component included in a switch fabric that is characterized as a packet-switched and destination-routed fabric. Additionally the switches may perform static routing. As known in the art, one drawback with using static routing techniques occurs when there is a problem with a link used for one or more paths between a source and destination. With static routing, any designated routes through a down connection fail. In order to perform rerouting using existing techniques, the routing tables are modified.

Described herein are techniques that may be used in connection with static routing such as in an embodiment with a destination-routed fabric. Such techniques may be used in connection with specifying one or more routes in the routing table for a given destination. The techniques herein may be used to populate the routing tables used by the switches. The routing tables may be populated with more than a single routing option for a given destination and a selection technique may be used to select one of the routing options. Also described herein are techniques for measuring the goodness or quality of a particular routing table mapping configuration in accordance with a goal of fault tolerance. When a routing table contains more than one defined routing for a given destination, selection techniques can be used to specify an alternate path without intervention and modification of the routing table.

Although use of a single switch is illustrated in the example of FIG. 3 as being connected to a host and a data storage system, it will be appreciated by those skilled in the art that a switch may be one of many components included in a variety of different networking topologies. Additionally, it should be noted that switches may be used in connection with performing routing within and between data storage systems.

Figure 4:
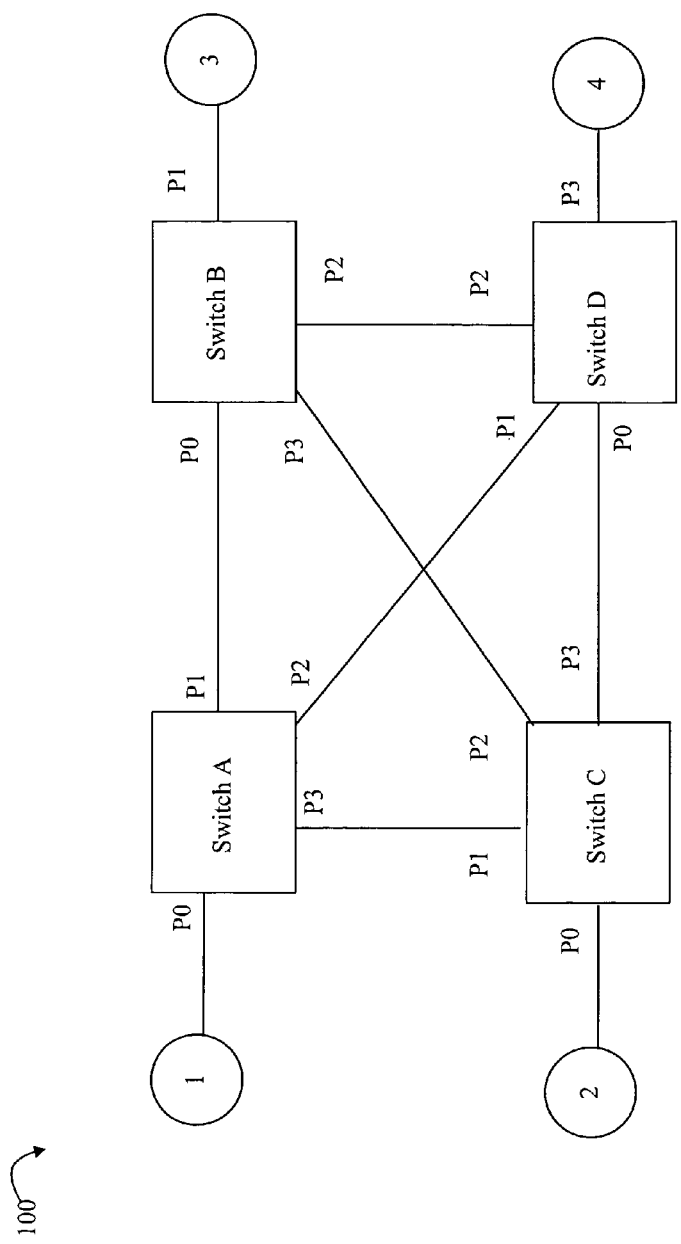
FIG. 4 is an example arrangement of switches with associated endpoints as may be included in a network utilizing the techniques described herein.

Referring now to FIG. 4, shown is an example 100 illustrating an arrangement of switches with associated endpoints as may be included in a network. The example 100 includes 4 switches (e.g., A, B, C and D), and 4 endpoints (e.g., 1, 2, 3, and 4). Each of the switches has 4 ports (e.g., P0, P1, P2, and P3). The example 100 is one particular topology for purposes of illustration of the techniques herein. In a destination routed fabric, each routing table used in each switch determines where to forward an incoming packet or other message based on the destination endpoint. Paths within a network may be specified for a particular source-destination pair in which the source and destination are endpoints. For example, one path for the source-destination pair (1,4) may use Switches A and D and go through Switch A using A's P0 as the input port and A's P2 as the egress port, and go through Switch D using D's P1 as the input port and D's P3 as the output port.

Each switch includes a routing table which is initialized with routing information prior to operation in connection with the embodiment described herein with static routing. The routing table specifies, for an incoming packet destined for a particular destination, which outgoing port of the receiving switch to use in forwarding the incoming packet. A routing table including a single set of routing information for a destination indicates use of a single link for forwarding the packet. If the single link goes down, the router is unable to forward any packets for the particular destination until either the link comes back online, or the routing table is updated, as by a network administrator, to specify another route for the particular destination.

In connection with techniques described herein, the routing table may be initialized to include more than one routing option for each destination. As will be described in following paragraphs, different selection techniques may be used in connection with selecting one of the multiple routing options for a particular destination. In one embodiment, this selection may be made using an alias field also included in the incoming packet.

Figure 5:
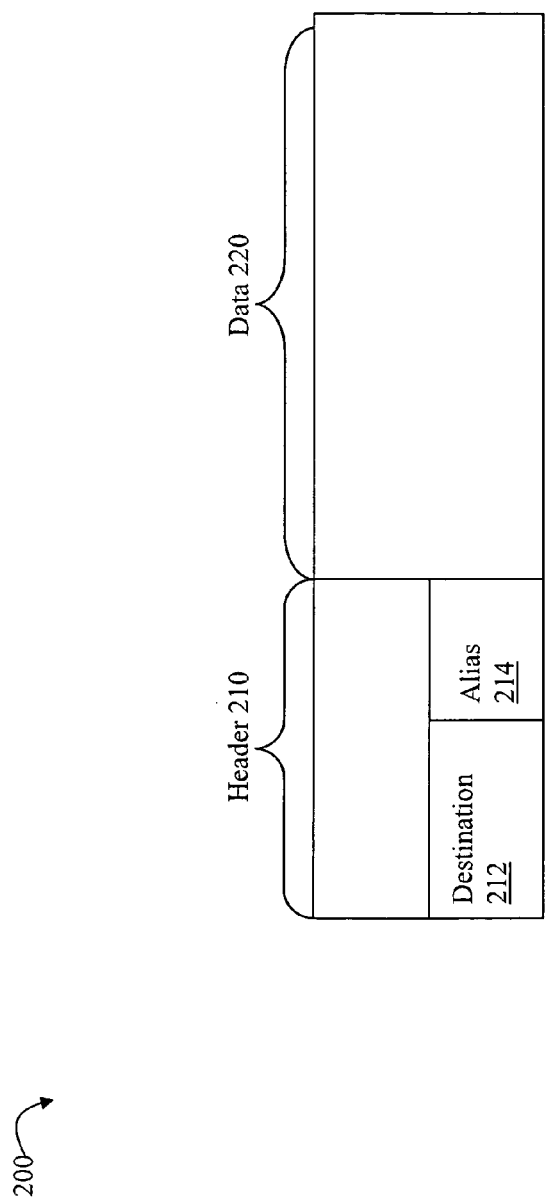

Referring now to FIG. 5, shown is an example representation of an incoming transmission, such as a packet, as may be received at a switch in the example network configuration of FIG. 4. The packet in the example 200 includes a header portion 210 and a data or payload portion 220. The header portion 210 includes a destination field 212 and an alias field 214. The destination field 212 may include information identifying the particular destination endpoint to which the packet is directed. The alias field 214 may be used in connection with selection of a particular set of routing information in accordance with the destination identified by the destination field 212. In one embodiment, the combination of fields 212 and 214 may be used to determine the particular set of routing information to be used in the event that there is more than one set of routing information for the particular destination.

The alias field 214 may be a size that varies in accordance with the number of routing options specified for each destination in an embodiment. For example, if up to 2 options for each destination may be included in the routing table, the alias field may be a single bit. If up to 4 options may be included for each destination, the alias field may be two bits.

As illustrated in FIG. 5, the incoming packet or other transmission may specify a value in the alias field 214. If the value of the alias field 214 is 0, it may be used to indicate that a particular routing option associated with a primary path, rather than one of the alternate paths, is to be used. As a characteristic of fault tolerance, if one of the links used goes down, an alternate path may be specified using the static routing information in the router. A higher degree of fault tolerance may be associated with an embodiment having a larger alias field due to the increased number of routing options for each destination included in the routing table.

Figure 6:
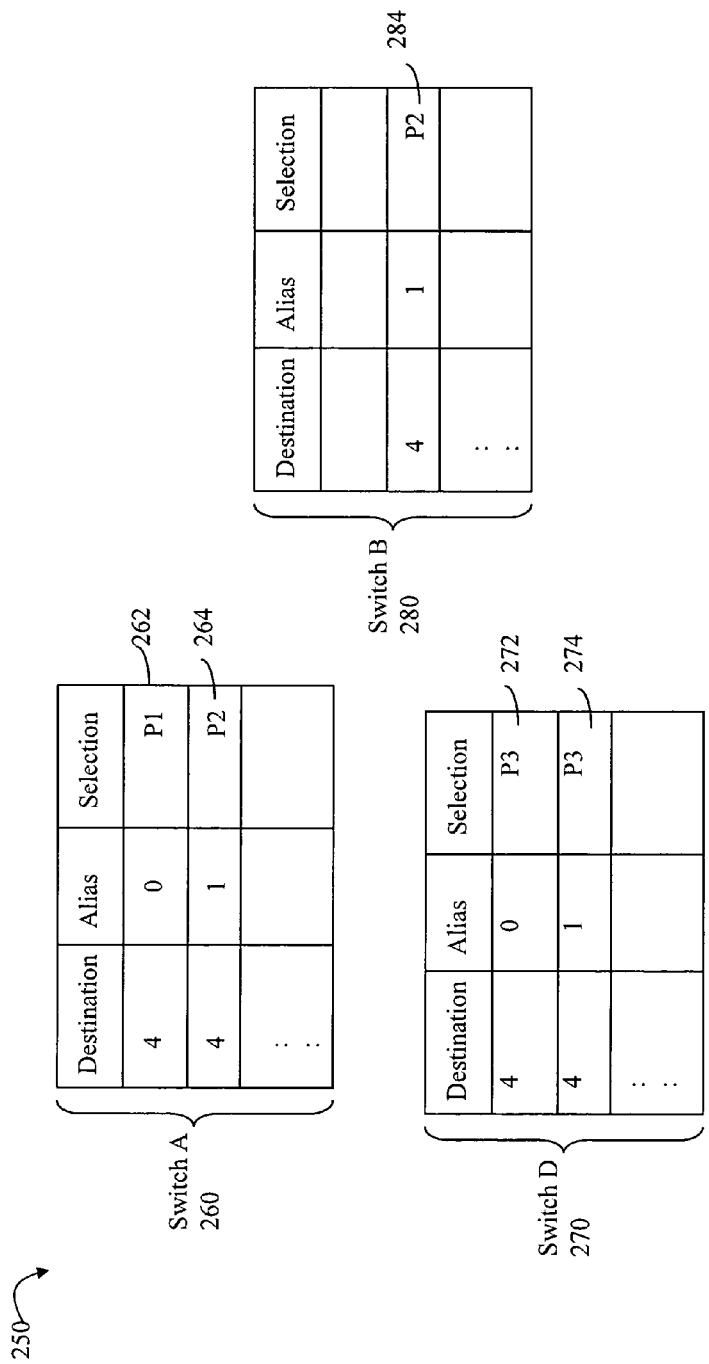

Referring now to FIG. 6, shown is an example 250 of static routing table information as may be included in switches A, B and D. The table 260 indicates the routing information for switch A. The table 270 indicates the routing information for switch D. The table 280 indicates the routing information for switch B. The destination and alias fields of an incoming transmission may be used as indices to obtain a routing selection from each routing table. With reference to FIG. 4, two different sets of routing information for two different paths may be specified for the destination 4. One path as specified using the alias=0 option uses switches A and D. A second path as specified using the alias=1 option uses switches A, B, and D. The routing tables are properly initialized with the routing information in order to ensure that these 2 paths are following in accordance with the alias bit setting.

The foregoing describes populating static routing tables with one or more sets of routing information, each set of routing information being associated with a different path for the same destination. The alias field in combination with the destination field of an incoming transmission may be used by the router in selecting one set of routing information.

Different techniques may be used in connection with determining the routing information used to initialized or populate the routing tables of the routers. What will now be described is a technique that may be used to populate a routing table with one or more sets of routing information. First, a description will be set forth for determining a single set of routing information as may be used in static routing tables. Subsequently, a description will be set forth of how this technique may also be used in connection with determining more than one set of routing information as may be used in an embodiment specifying multiple sets of static routing information.

The techniques described herein in connection with initializing routing tables with routing information may be characterized as a least cost routing technique which seeks to minimize the path length or other cost for each source-destination pair. Additionally, the techniques described herein seek to provide a degree of fault tolerance by varying the links used for the routing options for each source-destination pair.

In connection with examining the network topology, for example, as illustrated in FIG. 4, the network may be represented as a graph with edges and vertices or nodes. The edges are the links between any two nodes. The nodes may consist of terminals and non-terminals. The terminals may be the endpoints. The non-terminals may be all other nodes corresponding to a graph vertex having multiple edges connected thereto. With reference to the network of FIG. 4, the set of non-terminal nodes or vertices may be the switches represented as {A,B,C,D}. The set of terminal nodes or vertices may be the endpoints represented as {1, 2, 3, 4}. The set of edges may correspond to the links between any two nodes or vertices. The set of non-terminals in this example includes only switches although other components may be represented in the set of non-terminals in accordance with the particular network.

A complete example for determining a set of routing information for each of the routing tables for switches A-D illustrated in FIG. 4 will now be described. The routing information determined at various steps in connection with this technique is illustrated using FIGS. 7-12.

Figure 7:
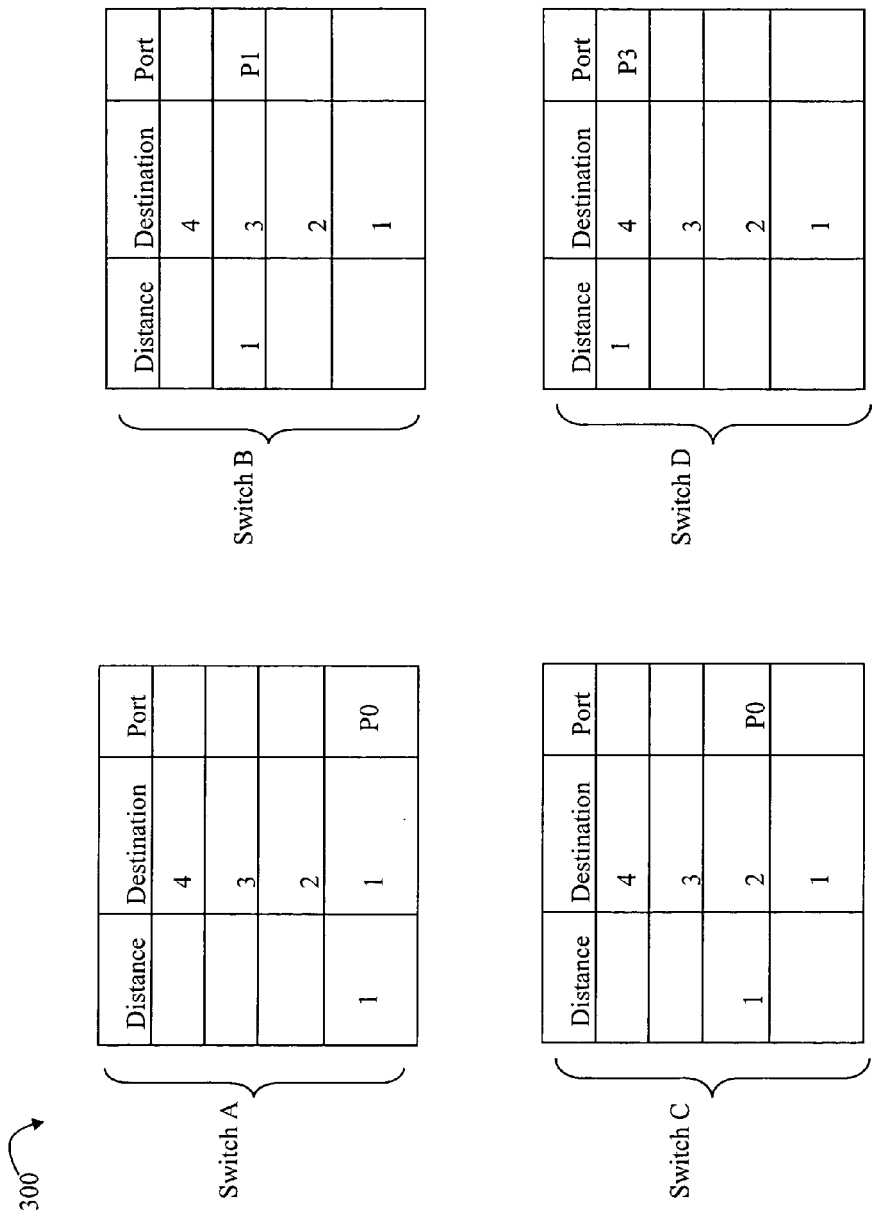

Referring now to FIG. 7, shown is an example 300 of routing tables that may be included in each of the switches A-D. As a first step in populating the static routing tables with a single set of routing information for a single path for each source-destination pair, the list of non-terminals is traversed. For each non-terminal, the set of directly connected terminals is determined. The distance for each of these directly connected terminals is determined with respect to the distance between the terminal and the non-terminal. In the example of FIG. 4, for simplification purposes of illustration, a distance of 1 is associated with each link although an embodiment may use other distances that also vary with each link. The routing table at each non-terminal, or switch in this example, is initialized to include the appropriate distance for each directly connected terminal. The routing table of each switch initialized to specify the particular port used as an egress or outgoing port for the particular destination. The example 300 of FIG. 7 shows the state of the routing tables of each switch at the completion of this step.

Subsequently, for each non-terminal in the network, the list of non-terminal's neighboring (e.g., without any other intervening non-terminals or terminals) non-terminals is determined and traversed. The routing information of each neighboring non-terminal is examined to determine what portions of the routing information, if any, should be adopted. This process is repeated until there are no changes to the routing information of any routing tables (e.g., no adoption of another non-terminal's routing information). It should be noted that a first switch is a neighboring switch of a second switch if the first switch is directly connected to the second switch, for example, without any other intervening switches or destinations.

In this example, the routing table of switch A is compared to that of neighboring switches B, C and D. Switch A adopts routing table information from its neighboring switches B, C, and D for a given destination if there is either no entry in A's routing table for the destination, OR if adoption of routing information from the neighboring switch's routing information results in a distance which is less than the current distance in A's routing table for the same destination. In connection with the adoption of any routing information, the associated port of the adopting router is also appropriately updated to forward any transmission to the neighboring switch.

Figure 8:
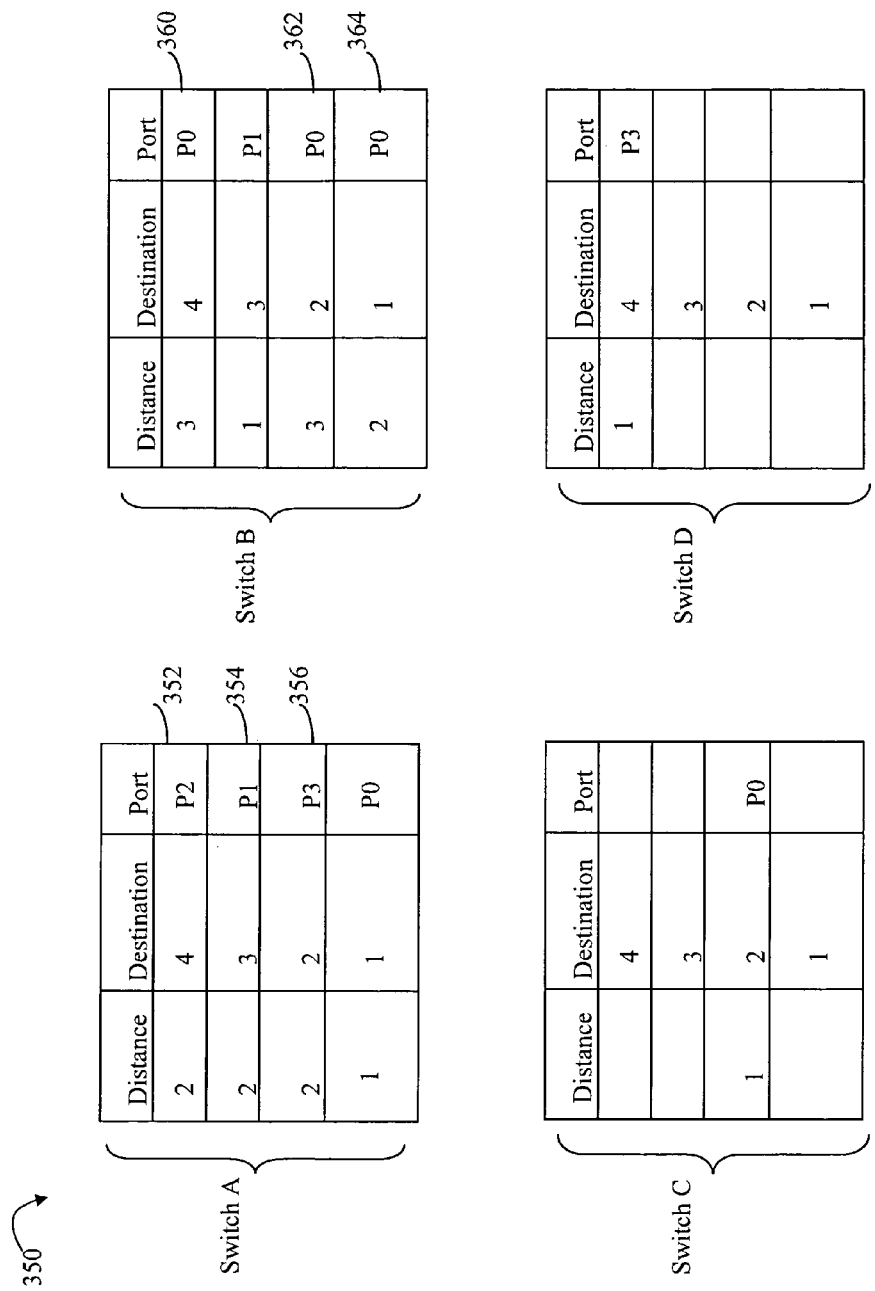

With reference to FIG. 8, switch A's routing information is compared to the routing information of switch B. Switch A adopts the routes for: destination 3 from switch B, destination 4 from switch D, and destination 2 from switch C. Switch A's routing information is updated with entries 352, 354, and 356 since switch A contains no routing information for the destinations associated with destinations 2, 3, and 4. Note that the distance is accordingly revised to include the distance with respect to switch A. For example, switch B's routing table for destination 3 specifies a distance of 1. Since it is an additional distance of 1 from switch A to switch B, when A adopts B's routing information, A adds 1 to the distance specified in B's routing information. Similarly, any distance associated with adopted routing information from neighboring switches is accordingly updated.

The next non-terminal, switch B, has its routing information compared to that of neighboring switches A, C, and D to determine if switch B should adopt any routing information therefrom. In comparing switch B's routing information to the routing information of switch A, switch B's routing information is updated to include routing information for destinations 1, 2, and 4 as indicated by elements 364, 362, and 360. Switch B's routing information is updated as just described since B does not currently contain any routing information for destinations 1, 2, and 4. B's information for destination 3 is not updated because adoption of such routing information from A does not result in a lesser distance between B and the distance specified for destination 3.

Switch B's routing information is compared to the routing information of switch C. With reference to FIG. 9, a determination is made as to whether B should adopt any routing information from switch A. Switch B adopts A's routing information for destination 2 as indicated by element 412. No other routing information from A results in a lesser distance for a particular destination. As a result of comparing the routing information of switch B to switch. D's routing information, switch B adopts switch D's routing information for destination 4 as indicated by element 410.

Figure 10A:
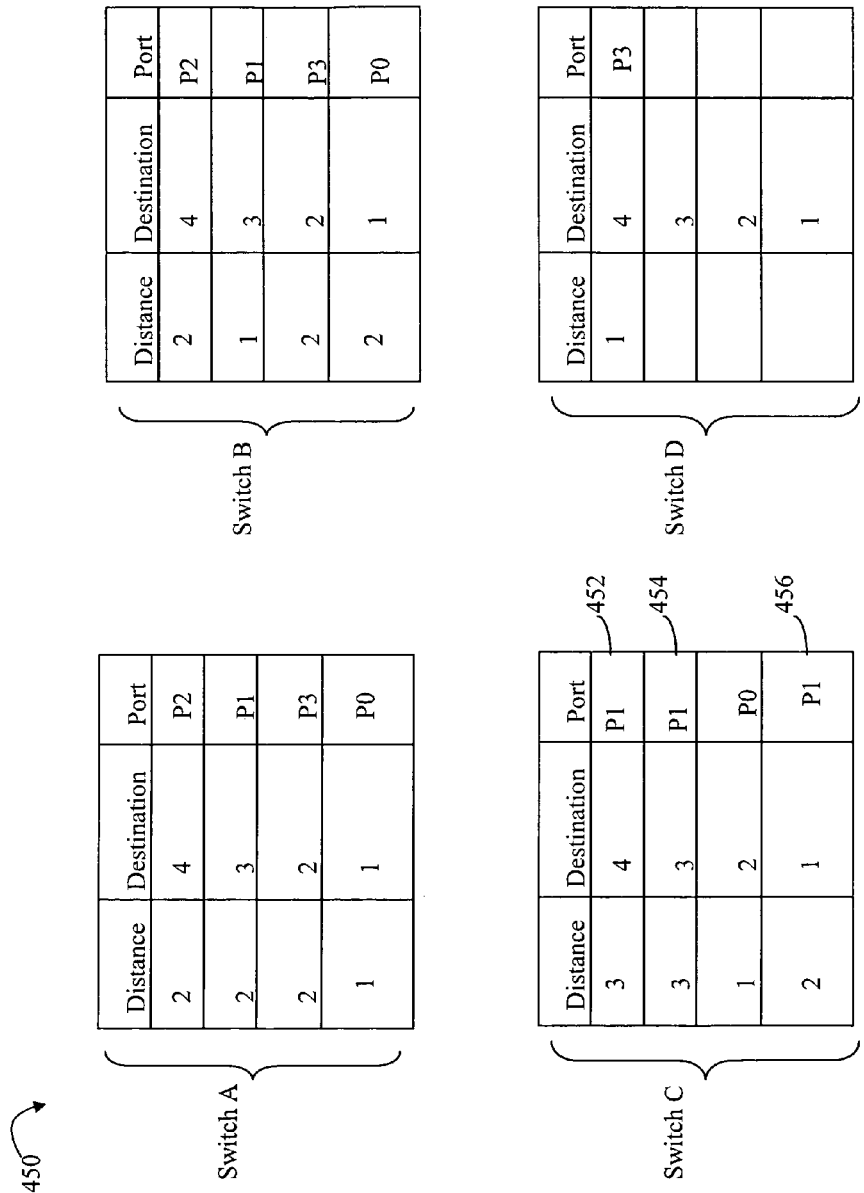

Switch C's routing information is now examined and compared to the routing information of other neighboring routers. With reference to FIG. 10A, switch C adopts A's routing information for destinations 1, 3, and 4. Changes to C's routing information are indicated by elements 452, 545 and 456.

Figure 10B:
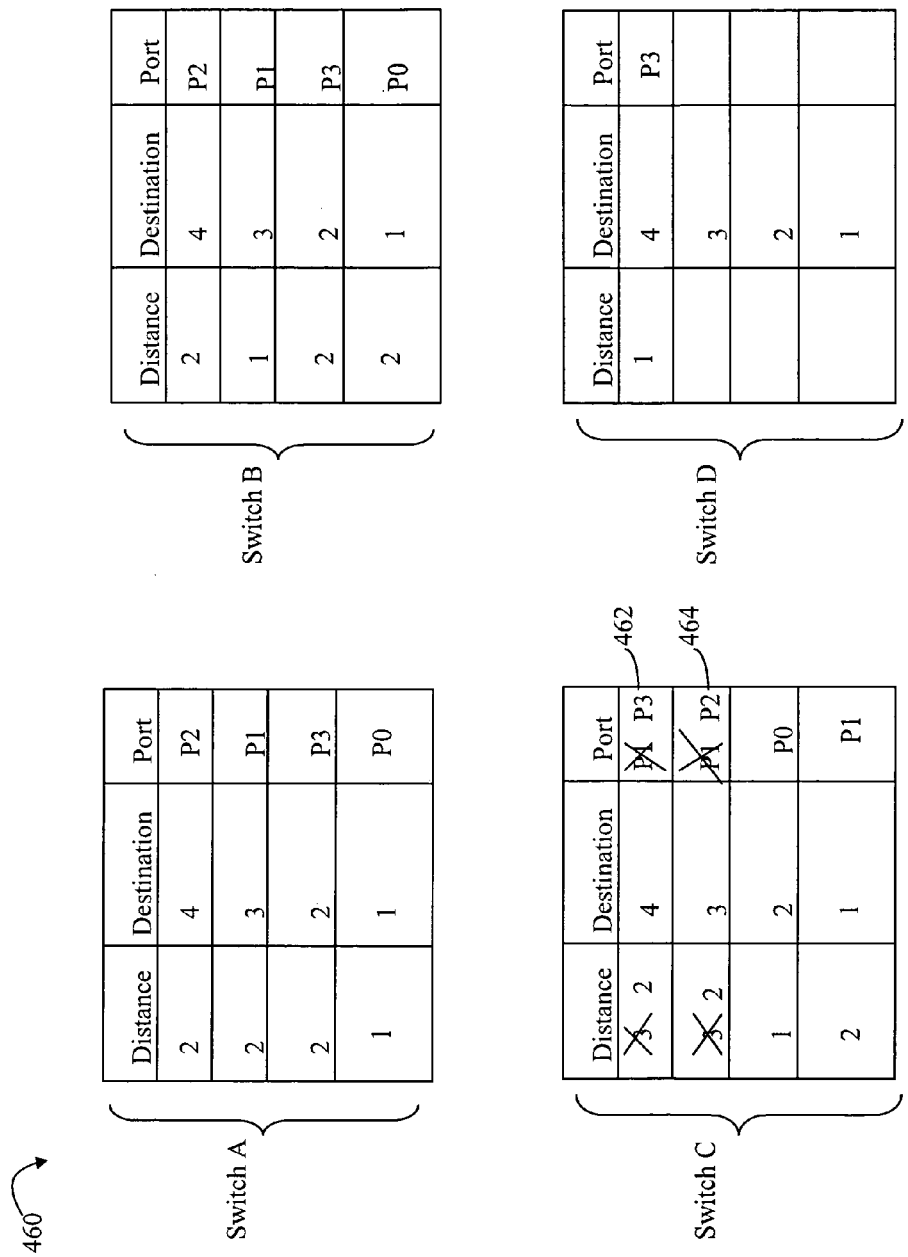

Switch C's routing information is compared to routing information in switches B and D. With reference to FIG. 10B, switch C's routing information is updated to adopt B's routing information for destination 3 as indicated by element 464. Switch C's routing information is updated to adopt D's routing information for destination 4 as indicated by element 462.

Figure 11A:
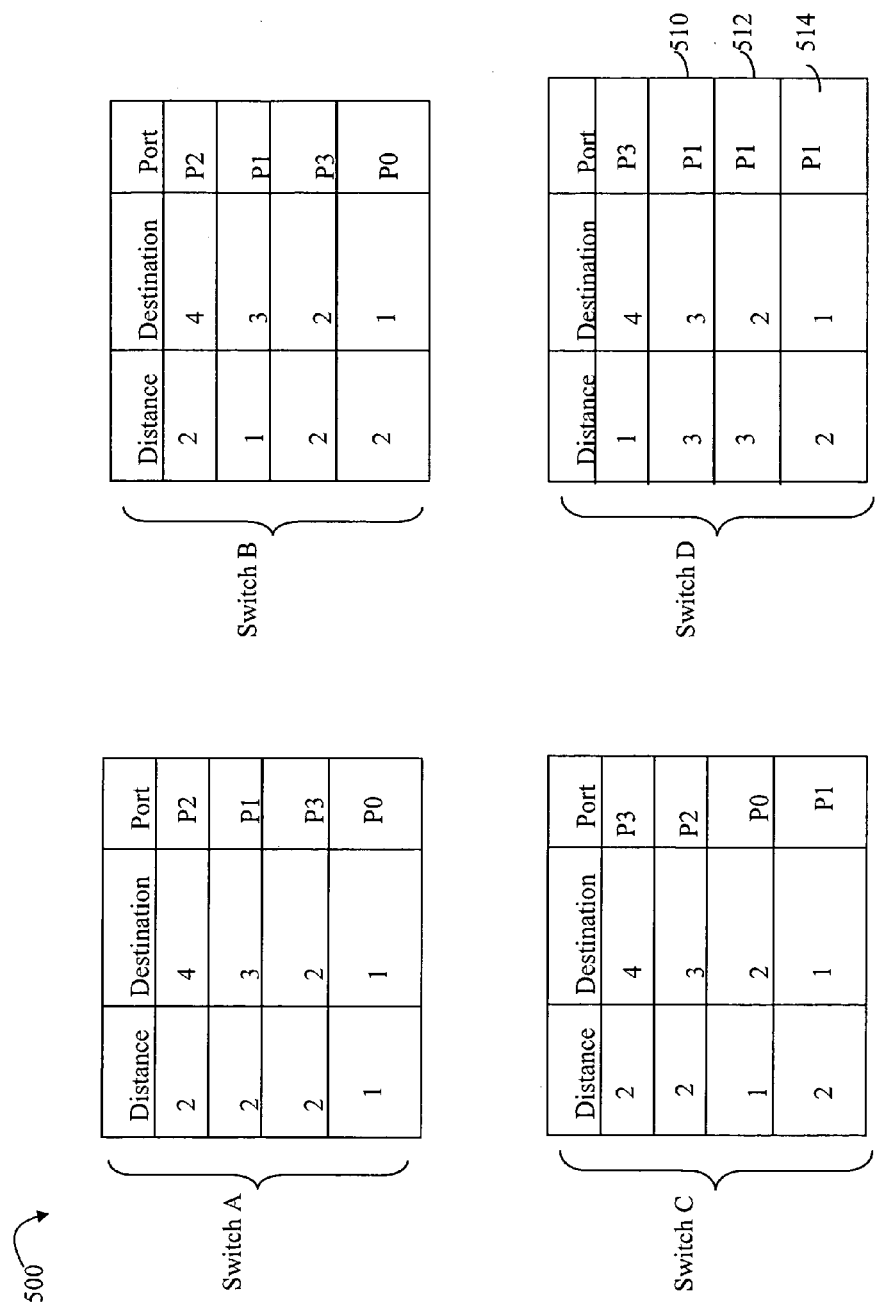
Figure 11B:
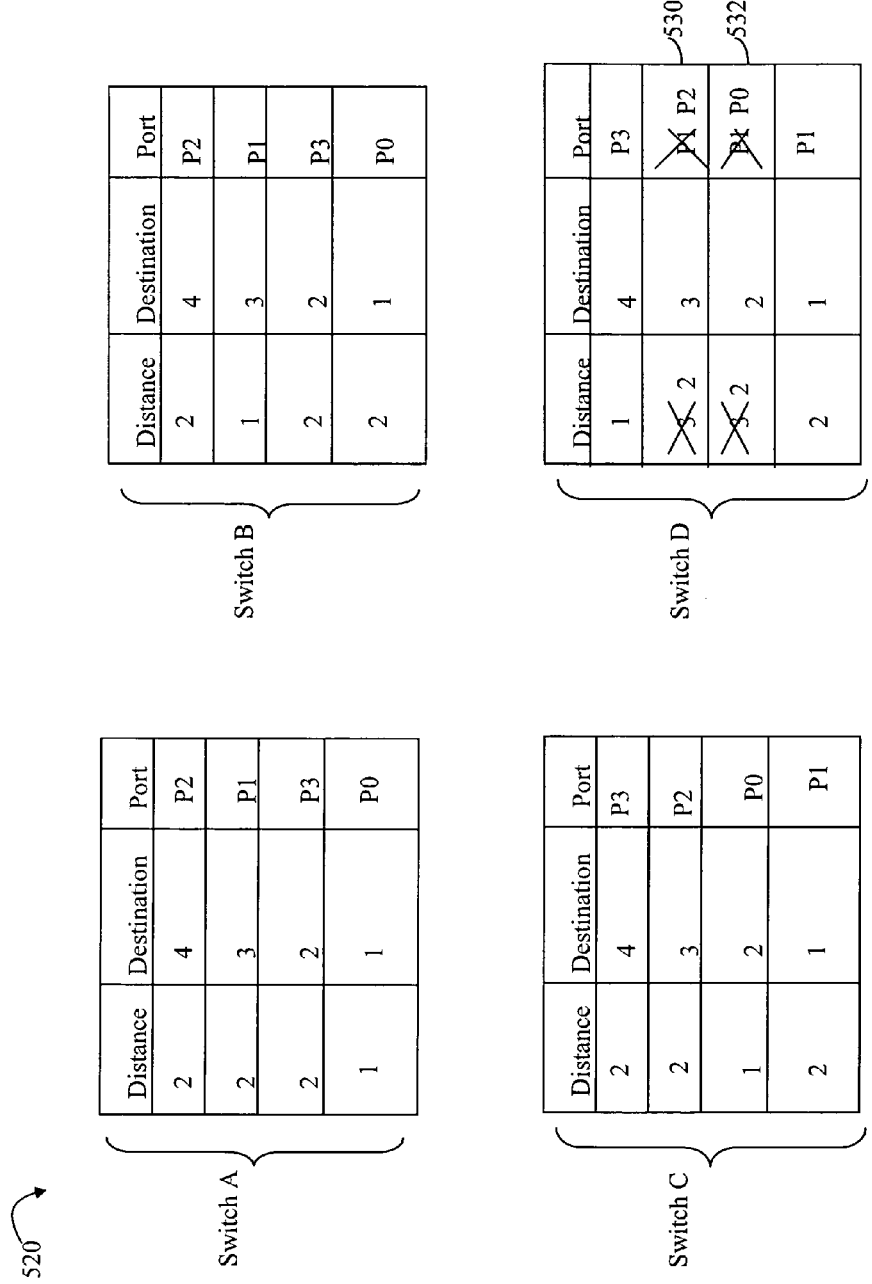

The next non-terminal, switch D, has its routing information compared to that of neighboring switches A, B, and C to determine if switch D should adopt any routing information therefrom. With reference to FIG. 11A, switch D's routing information is updated to adopt the routing information from switch A for destinations 1, 2, and 3. With reference to FIG. 11B, switch D's routing information is updated to adopt the routing information from switch B for destination 3 as indicated by element 530. Switch D's routing information is also updated to adopt the routing information from switch C for destination 2 as indicated by element 532.

At this point, the list of non-terminals has been traversed one time. Each non-terminal's routing information has been compared to every neighboring non-terminal's routing information to see if any neighboring non-terminal's routing information should be adopted. A determination is made as to whether there have been any changes to the routing information of any non-terminals (e.g., any adoption of another's routing information). If so, the foregoing process of traversing the list of non-terminals and comparing each non-terminal's routing information to that of every neighboring non-terminal's routing information for possible adoption is repeated until there are no adoptions made.

Figure 12:
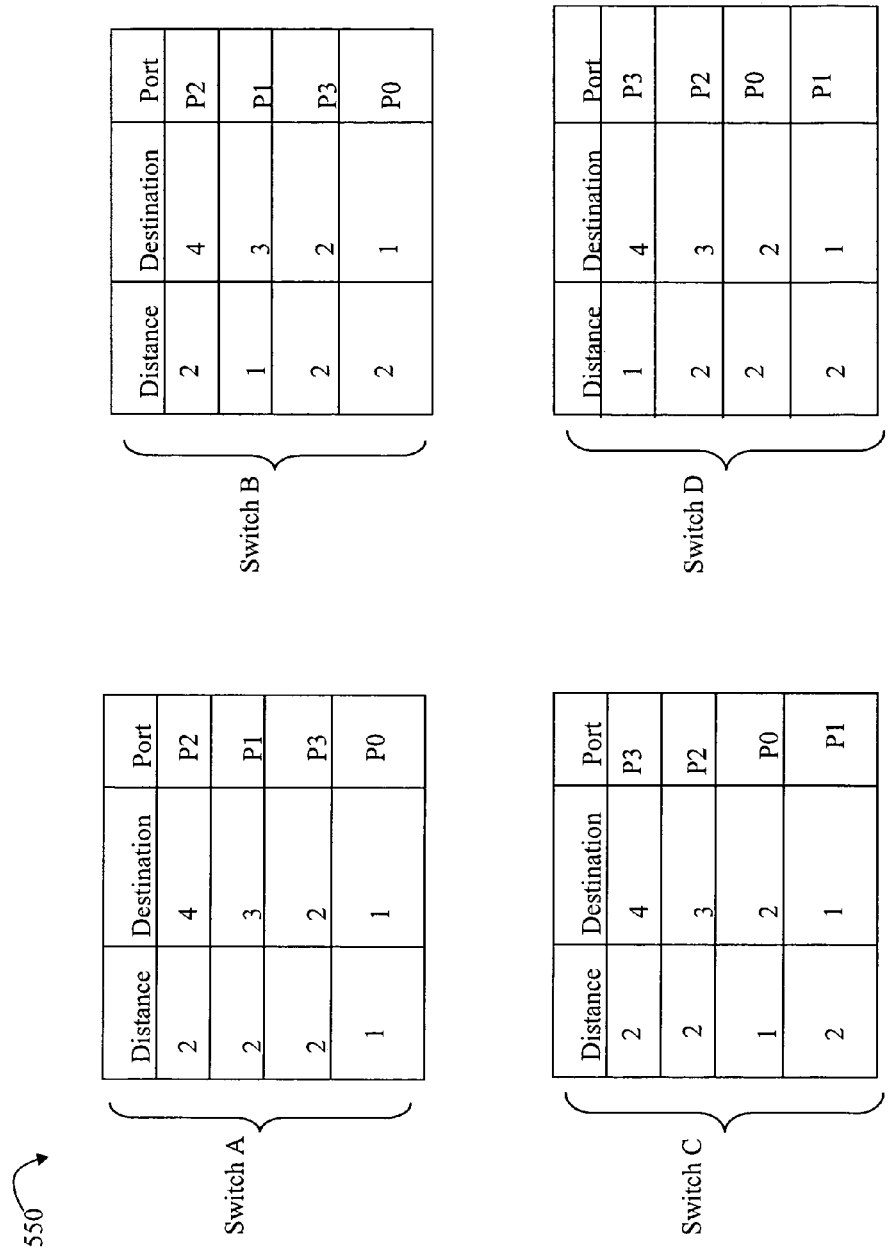

In connection with the current example, a subsequent traversal of the list of non-terminals results in no further adoptions or changes to routing information. The final determined routing information for each of the routing tables in switches A, B, C, and D is illustrated in FIG. 12.

Figure 13:
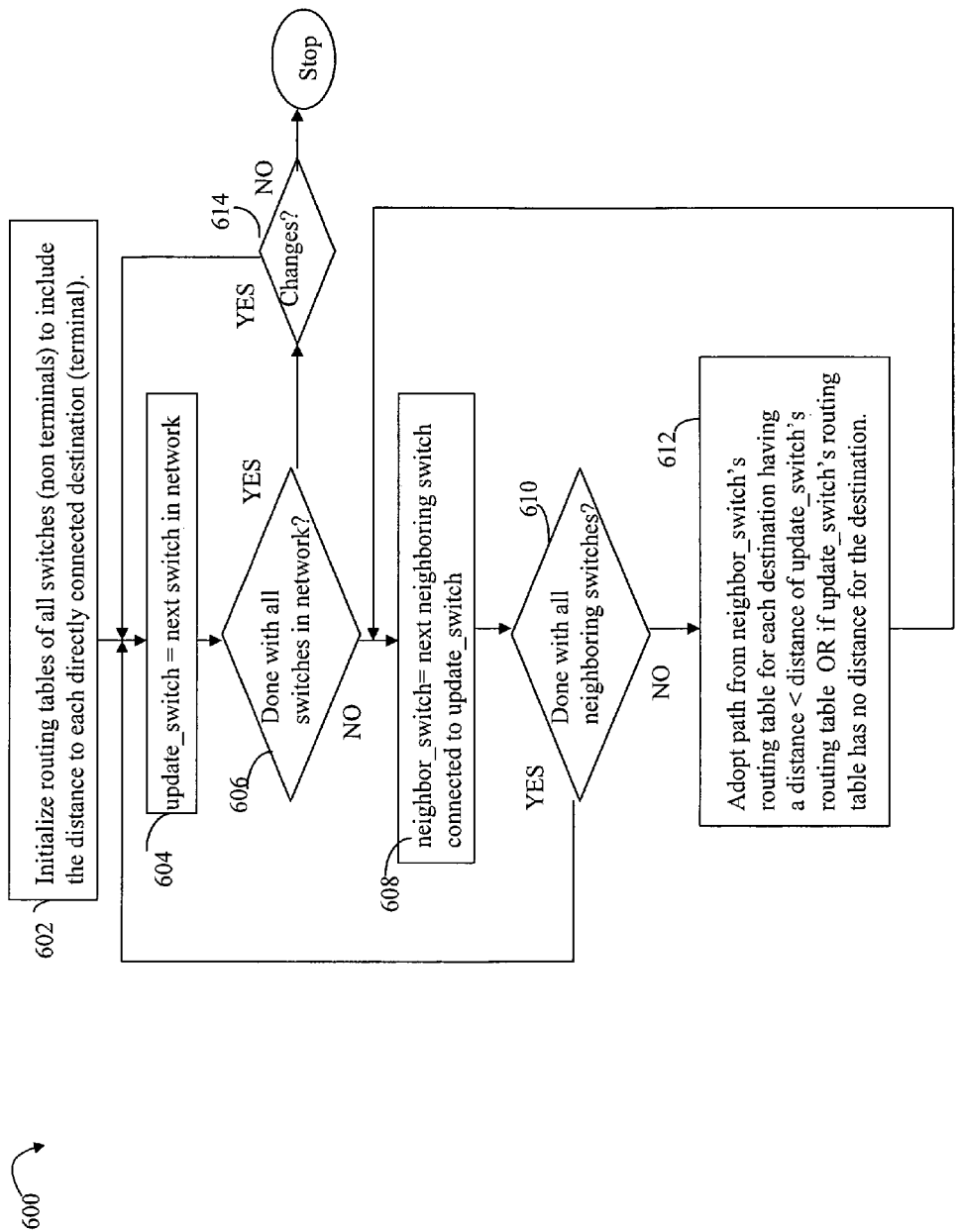
FIG. 13 is a flowchart of processing steps that may be performed in an embodiment in connection with determining routing information using the techniques described herein.

Referring now to FIG. 13, shown is a flowchart of steps that may be performed in an embodiment to determine a single set of routing information. The routing information may be used to populate a set of routing tables containing the routing information. The processing steps of flowchart 600 summarize processing just described and illustrated with respect to FIGS. 7-12. At step 602, the routing tables are initialized to include the distance of each directly connected destination. A list of all non-terminals, or switches in this example herein, is determined. At step 604, the variable update_switch is set to the next switch in the network from the list. At step 606, a determination is made as to whether all switches in the network in the list have been processed. If not, the list of all neighboring switches connected to the update_switch is determined and, at step 608, the variable neighbor_switch is set to the next neighboring connected switch. At step 610, a determination is made as to whether all the neighboring switches for the current update_switch have been processed. If so, control proceeds to step 604 to process the next switch in the network. Otherwise, if step 610 evaluates to no, control proceeds to step 612 where processing is performed to see what, if any, routing information is adopted from the neighboring switch. At step 612, the routing information is updated from the neighboring switch for a destination if the routing information results in a lesser distance for the destination than the current distance in the routing information of update_switch. Control proceeds to step 608 to process the remaining neighboring connected switches for the current update_switch.

If step 606 evaluates to yes indicating that all switches in the network have been processed, control proceeds to step 614. At step 614, a determination is made as to whether any changes have been made to the routing information of any routers. In other words, as described herein, step 614 determines whether any switch has adopted routing information of another neighboring switch. If so, control proceeds to step 604 to once again traverse the list of all switches in the network and compare each switch's routing information to routing information of connected neighboring switches. If step 614 evaluates to no, processing stops. The foregoing processing is repeated until no shorter paths for a given destination are determined.

The foregoing determines routing information resulting in the shortest path or least cost by examining those switches or non-terminals which are neighboring (e.g., connected with no intervening switch or destination) for comparatively shorter paths.

In one embodiment, the routing table may include multiple alternative sets of routing information for each destination. The foregoing technique of generating a single set of routing information for all routers or non-terminals may be repeated for generating additional alternate sets of routing information as may be selected using the alias bit in combination with the destination fields. The multiple sets of routing information may be used to initialize the static routing tables of each router.

Use of the foregoing technique may be used to generate additional sets of routing information. The processing steps summarized in FIG. 13 may be performed to generate a first set of routing information. The first set of routing information may be saved and used in connection with generating a second set of routing information so that, if possible, for any source-destination pair, a different route is generated than as included in the first set. It should be noted that depending on the network topology, for a first source-destination pair, there may be one or a lesser number of paths than the number of possible paths for other source-destination pairs. Processing using a modified adoption rule described in following paragraphs may take into account any differences in the number of possible paths for any source-destination pair.

In one embodiment, after the first set of routing information is determined, the outgoing port or other indicator of the particular link used for transmitting outgoing transmissions from each switch for each destination may be saved as state information associated with the first routing step. The saved state information may be used in generating routes for each source-destination pair in which the routes are different from those in the first set of routing information. The second set of routing information may be determined by executing the steps of FIG. 13 using a modified adoption rule (e.g., for example at step 612 of FIG. 13) to also consider the additional saved state information regarding the first set of routing information so that no adoptions are made if the adoption would result in duplication of a same port of a router for a given destination. For example, when determining a second set of routing information for switch A with reference to FIG. 12, the adoption rule of step 612 may include an additional condition. The additional condition may specify that a first switch does not adopt the routing information of a second switch for a destination if such adoption results in re-use of a port of the first switch that has already been included in a previous set of routing information for that destination for the first switch. For example, switch A's routing information for destination 4 would not be updated to adopt routing information from another routing table which results in reuse of port P2 by switch A for destination 4.

Figure 14:
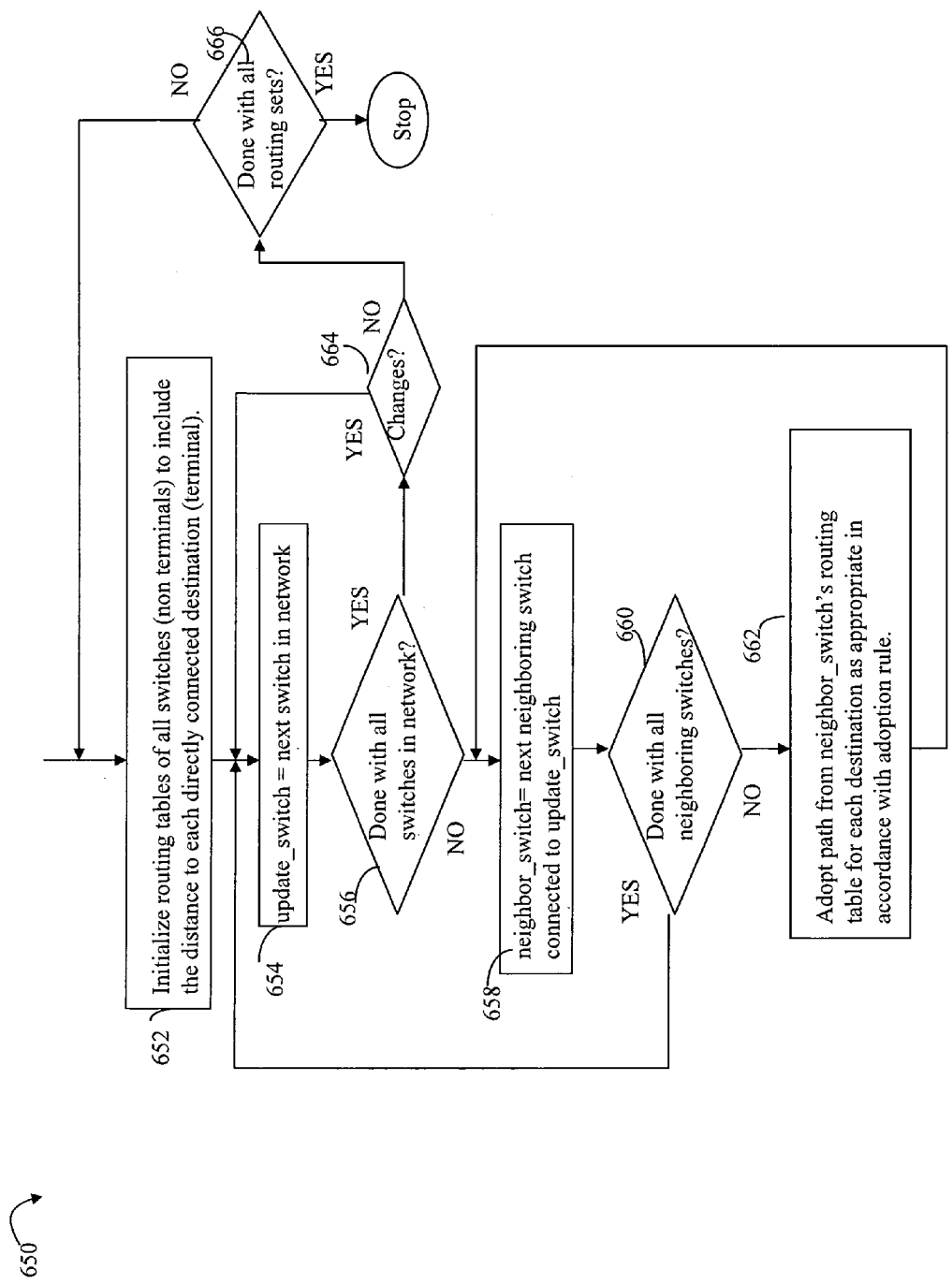
FIG. 14 is a flowchart of processing steps that may be performed in another embodiment in connection with determining routing information using the techniques described herein.

Referring now to FIG. 14, shown is a flowchart 650 of processing steps that may be performed in an embodiment for generating routing information. The steps of flowchart 650 may be used in connection with generating one or more sets of routing information using an adoption rule. Steps 652, 654, 656, 658, and 660 are similar, respectively, to steps 602, 604, 606, 608 and 610 of FIG. 13. Step 662 may be characterized as a generalized version of step 612 using any one or more different adoption rule criteria. Step 612 of FIG. 13 specifies one set of adoption criteria. A second set of adoption criteria is described above using the criteria of step 612 with additional saved state information from previously generated sets of routing information.

Steps 652, 654, 656, 658, 660 and 662 may be used in generating a first set of routing information. At step 664, a determination is made as to whether there have been any changes to the routing information. If step 664 evaluates to yes, control proceeds to step 654. Otherwise control proceeds to step 666 where a determination is made as to whether processing is complete for all routing sets. If so, processing stops. Otherwise, control proceeds to step 652 to generate the next set of routing information.

In the adoption rule of step 662, other additional or different criteria may be used in an embodiment. Such criteria may include additional inputs related to costs of a particular path or link included therein. The particular cost associated with a link or portion of a path may vary in accordance with the topological features of that link in the particular network. As described herein, one such cost relates to the length of the path. However, an embodiment may also associate other criteria with each path and links included therein. The particular costs may vary in accordance with different characteristics associated with each link including, for example, bandwidth, reliability factor, and the like. Different costs may be used when determining each route set. For example, three sets of routing information or three route sets may be determined. A first or base route set may be determined using the path length criteria. A second alternate set may be determined which is optimized for latency. In determining this second set, different costs related to latency may be associated with each path and links included therein. A third alternate set may be determined which is optimized for bandwidth or reliability. Yet a third different sets of costs related to the optimization goal may be associated with each path and links included therein. All three sets of routing information may be included in the routing table.

A set of routing information may be generated in accordance with optimizing one or more of the following characteristics:
 Fail-over re-routing due to link, switch or endpoint failure
 High error rate path avoidance
 Fairness to endpoints within a non-uniform topology
 Support for both strict-ordering and relaxed-ordering packet transmission paradigms
 Bandwidth load balancing within the fabric
 Latency sensitive packet traffic (QOS)
 Bandwidth sensitive packet traffic (QOS)
 Internal congestion or head-of-line blocking avoidance As such, different costs may be accordingly used in connection with each of the foregoing in connection with an adoption rule to determine costs based on criteria other than, for example, path length as described in connection with examples herein.

In an embodiment with routing tables initialized with more than one set of routing information, a particular set of the routing information may be selected for use. In one embodiment, a selection can be made in accordance with the alias bit setting as may be specified in an incoming transmission. The combination of the destination and alias bit may be used by the switch hardware and/or software to index into a static routing table to select one particular set of routing information. Rather than use the alias bit, for example, if such an alias bit is not specified or otherwise not included in a particular incoming transmission, the hardware and/or software in a switch may use other selection techniques. For example, a specified bit position of the destination or other field of the incoming transmission may be used in selecting a set of routing information. The destination address field may be used in connection with a mathematical modulus (e.g, MOD) operation to select a set of routing information. For example, if the destination field includes 6 bits and there are 4 sets of routing information from which to select, a bit mask of "000011" may be used to extract the values for the 2 least significant bits of the destination field. These two bit values may be used as the "alias" bit(s) described elsewhere herein in combination with the destination field to select a set of routing information.

Figure 15:
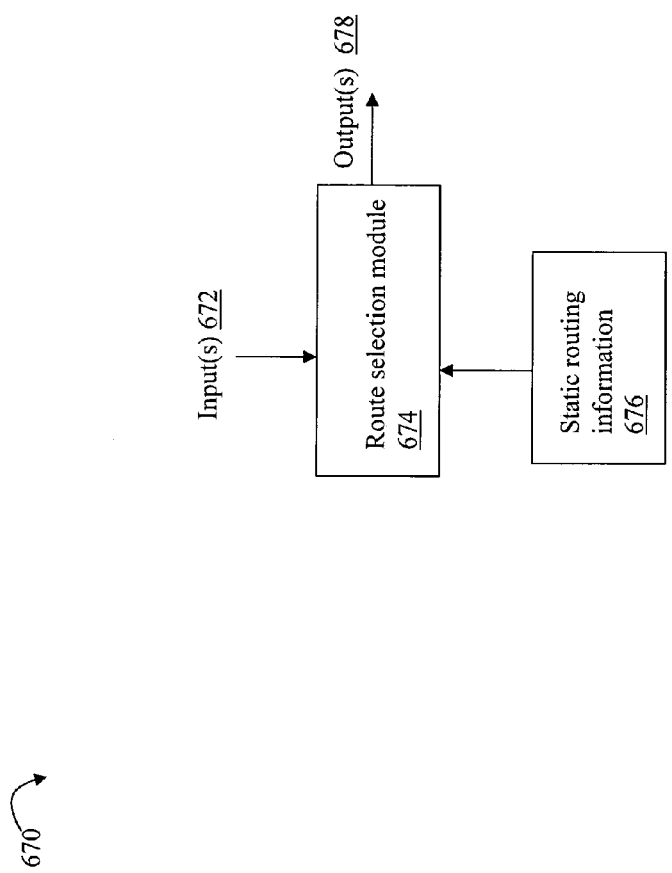
FIGS. 15 and 16 are example embodiments of components that may be used in connection with the techniques described herein for selection of routing information for routing a transmission received at a switch.

The alias bit or other one or more bits performing the route selection function may be used to specify a single path selection. Such bits may also be used to specify other selection techniques alone, or in addition to, identifying a specific path. For example, a switch may utilize 2 sets of routing information as described herein. Additionally, the switch may be instructed to utilize another technique in connection with path selection. Based on two bits of information, a determination may be made as to whether to use a first set of routing information, a second set of routing information, or use another technique, such as random selection, to determine a set of routing information. Such information may be encoded in two bits as follows:
 0 0=use random selection or other automated selection technique
 0 1=use first set of routing information
 1 0=use second set of routing information Referring now to FIG. 15, shown is an example of components that may be included in a switch in connection with selection of routing information as described above. The example 670 includes one or more inputs 672, route selection module 674, static routing information 676, and one or more outputs 678. The route selection module 674 may be implemented in hardware and/or software to make a selection of one or more sets of routing information 676 in accordance with one or more inputs 672. The module 674 may include instructions which are executed by a processor in a switch to make a selection of one of the sets of routing information of 676 in accordance with one or more inputs 672. The selection made by 674 is represented as the one or more outputs 678. In one embodiment, the module 674 may perform a random selection of a set of routing information. The module 674 may also select a specified set of routing information. The specified set may be an input of 672 that can be programmed and reprogrammed manually, as by a network administrator. The inputs 672 may also include one or more inputs which are internal and/or external with respect to the switch and may be used by the module 674 to provide for dynamic selection of routing information in an automated fashion in response to other external inputs. For example, the module 674 may receive one or more external inputs. The module 674 may accordingly make a determination that a particular set of routing information should be used. For example, the module 674 may receive inputs regarding failed transmissions, down links, and the like. Based on this, the module may select a particular set of routing information. The module 674 may select a same set of routing information for all destinations or may vary the set of routing information used for a portion of the destinations (e.g., one or more destinations but not all) at a switch.

As described elsewhere herein, an embodiment may have different sets of routing information in which each set of routing information is optimized in accordance with one or more specific characteristics. For example, a first set of routing information may be optimized in accordance with costs related to latency. A second set of routing information may be similarly optimize in accordance reliability, and/or bandwidth. In connection with selecting between the different sets of routing information at a switch during operation, one or more inputs 672 may be used to specify which set of routing information to select in accordance with the particular desired optimized characteristic(s) associated with each set of routing information.

Figure 16:
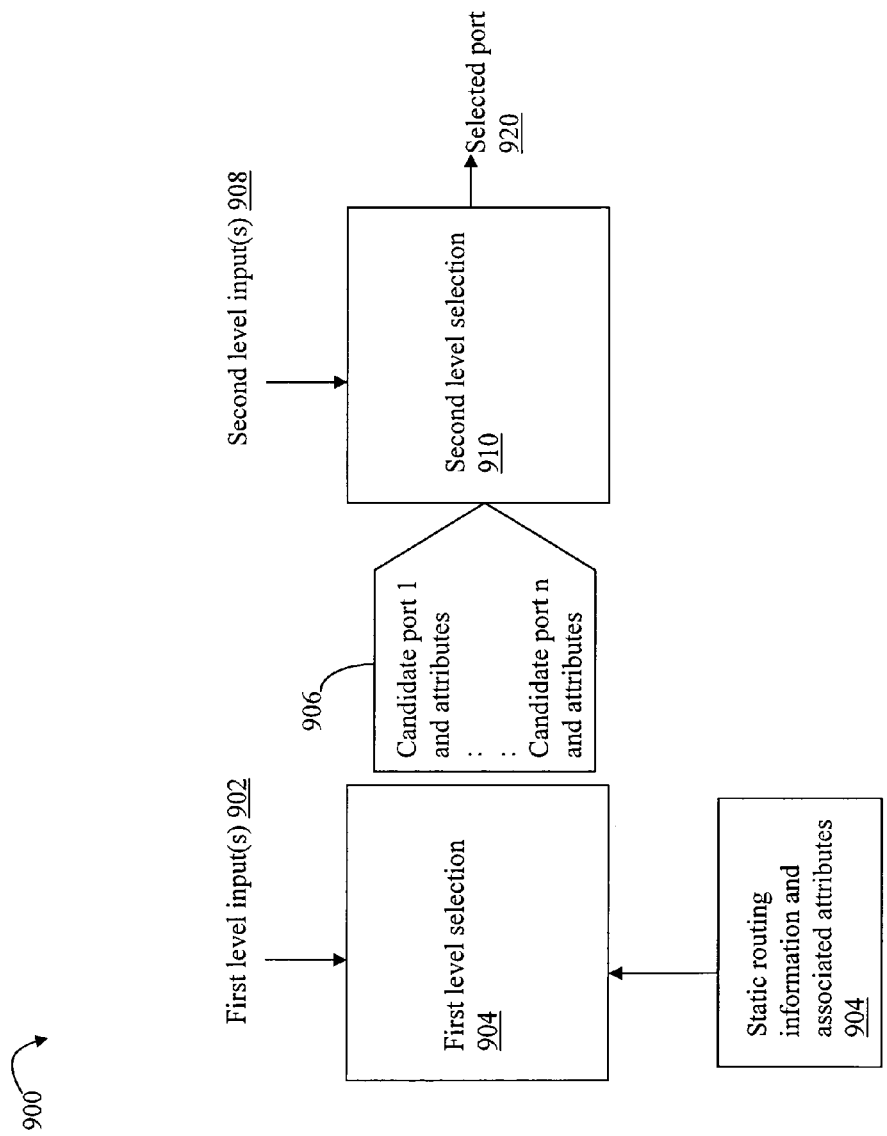

Referring now to FIG. 16, shown is another example of an embodiment of components that may be included in a switch in connection with performing routing therein. The example 900 illustrates additional detail of components for one embodiment of the example 670 of FIG. 15. In 900, the components 904, 906 and 910 may be included in the route selection module 670 of FIG. 15. The inputs 902 and 908 may comprise inputs of element 672 of FIG. 15. The static routing information and associated attributes 904 may include the static routing information as described in connection with 676 of FIG. 15 and illustrated, for example, in FIG. 12. Additionally, an embodiment may include other attribute information in 904 as will be described in more detail in following paragraphs. The selected port 920 is the output port of the switch used in connection with routing a received transmission.

As illustrated in 900, one or more first level inputs 902 are input to the first level selection component 904 to select a portion of the static routing information and associated attributes 904. The selected portion is output as represented by element 906 which is input to a second level selection component 910. The second level selection component 910 selects one of the candidate ports from 906 in accordance with the one or more second level input(s) 908. The selected port is output as element 920.

It should be noted that the components of FIG. 16 may be implemented using hardware and/or software.

FIGS. 15 and 16 provide for adaptive routing decisions within a fault tolerant packet switched fabric. As described elsewhere herein, such routing decisions may be in accordance with one or more routing optimization goals and associated characteristics for example, such as:

Fail-over re-routing due to link, switch or endpoint failure
    High error rate path avoidance
    Fairness to endpoints within a non-uniform topology
    Support for both strict-ordering and relaxed-ordering packet transmission paradigms
    Bandwidth load balancing within the fabric
    Latency sensitive packet traffic (QOS)
    Bandwidth sensitive packet traffic (QOS)
    Internal congestion or head-of-line blocking avoidance The adaptive routing decisions are made by individual switching elements using switch-locally accessible information as represented collectively by elements 902, 904, and 908 of FIG. 16. The routing decisions may be made using static and/or dynamic inputs. The dynamic inputs, as described in more detail elsewhere herein, may change over time in accordance with a state of the switch. The dynamic inputs may also change over time in accordance with network conditions or characteristics external to the switch. Examples of such information may include:

a) Per-packet content for routing requirements as determined by the sender (fabric endpoint) and communicated as part of the packet being routed,
  b) Pre-calculated or static information present in the switch. This information is based on foreknowledge of the system fabric topology and its attributes (includes operational state and performance capabilities). An example of such information is the one or more sets of routing information, such as illustrated in FIG. 12, that may be generated prior to operation of the switch.
  c) Candidate port provided dynamic information. This is performance or capability information provided by attached other fabric devices on candidate output ports. An example is notification of available credits for buffer availability.
  d) Internally provided dynamic information. An example is switch output port buffer useage.
  e) Updates to pre-calculated information. An example is information presented by the fabric management agent qualifying or describing topology changes.

What will now be described is more detail on each of a)-e) above and the use of this information in connection with the example 900.

In connection with category a) Per-packet Content, it should be noted that packet content may differ with packet switched fabric protocols. Such protocols may include use of a packet data payload and information to allow switches to successfully route the packet. Examples of packet routing information may include:

1. Destination (Target) Address/ID
    This is the destination endpoint as illustrated in connection with element 212 of FIG. 5 indicating where the packet is to be routed without specifying the route to be taken. As also illustrated herein, an alias field may be used alone, or in connection with other criteria, to select the particular route. The alias field is also illustrated in FIG. 5. In one embodiment, the alias information may be included as a portion of the destination field.
    As described elsewhere herein, this destination identifier may be included in the first level input information 902 used to index into the routing information of 904 to determine one or more candidate ports.
  2. Source (Sender) Address/ID
    Similar to destination address/ID for protocols that support response packets (e.g. load/store capable), this specifies the endpoint to which any return packet is to be sent. Although the return address/ID is not used for most routing-table based packet switches, it can be used as a qualifier. Examples are:
      Pairing destination/source IDs can be used to define a context for ordering or sequence relationships
      Forcing same path traversal (in reverse) for associated return packets The source address or identifier may be included in the first level input information 902 used to index into the routing information of 904 to determine one or more candidate ports. For example, consider one embodiment in which the alias bits are included as a portion of the source and destination address fields. If the alias bits of the source and destination address fields are equal, this may indicate a desire on the part of the source that strong ordering is desired. As described elsewhere herein, strong ordering is the desire to route packets for a same message using the same path selection. If the alias bits are not equal, this may indicate a desire on the part of the source that a relaxed ordering is permitted. A relaxed ordering, in contrast to a strong ordering, is the routing of packets for a same message using different path selections. The source address field may also indicate, for example, that the source wants the destination to send a response to another node other than the source (e.g., as may be specified in connection with spoofing, node traversal packet daemon algorithms, and the like).

3. ID Alias (Packet Routing) Information (Optionally for Associated Return Packet Routing as Well)

In one embodiment as described herein, this may be represented as the alias field included in the incoming packet used to select a route. The alias field as illustrated in connection with FIG. 5, may be used to convey explicit routing instructions not available to the switch as either pre-calculated or dynamic information. An embodiment may utilize the alias information to influence the routing decision. The alias information may be included as a second level input 908. For example, the alias information may be used to:

Specify an exact routing path. This can take the form of all the information needed to enumerate the entire path, or can specify one of a set of candidates already pre-calculated for the switches as described elsewhere herein. The former requires every sender to understand the exact topology of the Fabric, whereas the latter allows the sender to specify a unique path (for instance for order of delivery related packets) for the packet without needing to know anything about the Fabric. If the sender is selecting the routing path, the sender is then responsible for routing around Fabric failures, doing load-balancing, etc. The advantage of specifying an exact routing path is the ability of the sender to have more control over fabric routing. The disadvantages are that the sender has to be aware of changes to the Fabric topology (e.g. failed links), and the sender may not have access to the same information that the switch has (buffer utilization, credits, etc).

Communicate that any path selection is acceptable, and the selection is entirely in the control of the switch. This would be the default case if this information was not provided with the packet. Having encodings, default values, or validity bits for the alias information provides the capability for the sender to force specific path routing on a per-packet basis, and leave the routing of others to the switch for optimization. As an example, a two-bit field could be defined as:

00 Routing optimization left to discretion of the switch
01 Force route to the first candidate output port
02 Force route to the second candidate output port
03 Force route to the third candidate output port This information may be included as a second level input 908.

4. Alias Exclusion Mask.

A refinement of the hard choice between specifying one route or allowing the full set of routes is to provide an exclusion map that allows the sender to specify a subset of the full pre-calculated set available to the switch.

The alias exclusion mask information may be included as a second level input 908.

5. Packet Priority

Priority information is often included in packet switched fabric protocols, and provides a means of avoiding deadlock, avoiding contention issues, promoting fairness, and communicating a sense of urgency, requirement for low latency, or other QOS considerations. Protocols that do not have an explicit priority usually have the concept implied—for instance packets could be classed by function as initial request packets and completion packets, with a re-ordering rule that completions must be promoted (presented first) before requests under conditions of back-pressure (inability for requests to be transferred), an example of a two priority scheme intended to avoid deadlock scenarios.

It should be noted that priority can also be used to influence route selection examples may include Dedicated (or preferred) route paths for packets of a specific priority
Comparison with priority levels able to be accepted by candidate output ports
Comparison with other input port buffered packet priorities competing for candidate output ports
Priority level used in conjunction with port biasing (pre-calculated arbitration weighting)

The packet priority information may be included as a second level input 908.

6. Ordering Requirements

Ordering requirements may differ between implementations, and sometimes within a single implementation. Ordering, as distinct from priority promotion to avoid deadlock, may be described as the temporal ordering of a set of packet transmissions from one source to one destination such that, for packet transmission through the fabric, packets initiated from the source arrive at the destination in the same order they were issued (referred to as strong ordering). This is usually qualified or restricted to apply only to individual classes of packets, for instance within a defined virtual channel or within one priority class. Some endpoints or (applications utilizing the service of those endpoints) have strong ordering requirements (e.g. if a write is issued to a storage element on another endpoint, followed by a read of that same storage element, the read data returned must reflect the prior write). Other applications are more tolerant, and have relaxed ordering requirements (e.g. message packets can be sent in any order to an endpoint that has the ability to re-order as needed after delivery of the packets).

Fabrics that allow multiple paths by definition support relaxed ordering. The most common means of providing on-demand strong ordering within the same fabric is to ensure that for a class of packets (referred to here as a "context"), that the same route is always taken (always choose the same candidate output port), and that the switches do not re-order the packets as they traverse the switch. Switches that only route from one input port to only one output port for a given packet destination, and do not internally re-order packets, support a strong ordering paradigm by design.

There are ways that endpoints can accomplish ordering in fabrics that always utilize multiple paths. An example of this is to ensure that all request packets have associated response packets issued by the receiver back to the sender (either by hardware or software at the destination), and then not issue the next packet until the previous response has been received.

The source having explicitly forced a particular alias or path to be taken for the set of packets it wishes to be ordered (as described earlier) also accomplishes the desired effect.

An alternative to support strong ordering within a Fabric by switches that allow multiple paths implies the request for strong ordering be communicated in the packet to be routed, as well as communicating the context in which the packet belongs. The request for strong ordering can be done explicitly as a field within the packet, or can be implied by other packet information such as pre-defined source/destination pair contexts, virtual channel, class or priority information. The switch is then responsible for extracting the context to which the packet belongs, and selecting the pre-computed unique path that is assigned to packets of that context. One advantage of this alternative is that since the source is not explicitly forcing the port selection, the switch can deal with a failed path scenario and re-route traffic without the source needing to know the current state of the Fabric.

The ordering requirement information may be included as a second level input 908.

7. Broadcast or Multicast Routing Information

For protocols that support sending a single packet to multiple destinations, information is included in the packet to indicate that this is the desired behavior. Information may also be included in the packet to specify a set of destinations (e.g., may be explicitly enumerated or by group or set).

The broadcast or multicast information may be included as a second level input 908.

The precalculated or static information b) may include the pre-calculated or static information as described elsewhere herein and included in 904. Such information may also include port attribute information. The precalculated information b) may be take the form of loadable information, as illustrated in FIG. 16, or may be implied by the switch design itself.

Static routing information may include a temporary port usage restriction list intended to allow idling portions of the fabric for repair or reconfiguration. Such a list may specify certain ports to use at different dates and/or times of day and may be used as a second level input 908.

Another type of pre-calculated information b) may include a stated output port fail-over policy. Such information may be used as a second level input 908. The port fail-over policy may designate one of the following as an input in connection with port selection of 910 such as instructing the switch to:

Use a designated secondary port identified by the routing table

Use a redundant backup port (e.g. odd ports are backups to even ports)

Use a next most optimal candidate output port

Not re-route on link failure—treat as failed packet

Use next-higher-numbered candidate port. An embodiment may wrap around and start with the lowest port number if already at the highest port number.

As described herein, the pre-calculated information b) may be determined using techniques as described herein. Routing information is provided in a routing table that correlates a single destination address/ID value as included in an incoming transmission with one or more output ports. An implementation may provide a separate routing table for each input port as well as a global table used by all input ports. The content of the routing table may be static or pre-calculated using techniques described herein based on a knowledge of the fabric topology. An embodiment may also utilize a switch which executes code that may generate such routing information using techniques described herein at selected or periodic intervals in accordance with one or more heuristics.

As illustrated in the example 900 with the techniques described herein, a routing table may be used which contains routing information designating more than one output port for each destination address/ID. Such routing information which is pre-calculated or static may be included in element 904. These output ports indicated in the routing information may be characterized as the set of candidate output ports of 906 that provide connectivity to the destination endpoint.

The precalculated information may also include attribute information associated with each candidate port. The attribute information may be stored along with other the static routing information as represented by element 904. The attribute information and candidate ports may be used as inputs 906 to the second level selection 910 which selects one of the candidate ports as the output port 920. Examples of attribute information may include, for example:

Pre-defined per-port class assignments. As known in the art, groups of ports may be formed in connection with certain characteristics. For example, use of a particular port may be used to specify secure connections or links. A particular port may be used for only traffic from one or more specified source identifiers, and the like.

Reservations (e.g. paths restricted to specific priority packets)

Knowledge of trunking or other downstream performance attributes for the path between the switch and the endpoint.

Anticipated average link utilization predictions

Pre-calculated knowledge of preferred routes to promote fairness or QOS (quality of service) based on flow determination. As known in the art, flow may be characterized as a relationship between a set of sequential packets as may be determined, for example, using a subfield of a sequence identifier of a packet.

Number of other switch transitions for a given path between the switch and the endpoint. This may also be characterized as a number of hops or path length.

Pre-calculated expected time-of-transmission (either minimum possible or anticipated average)

Primary/Failover assignments

QOS level, capabilities, or capacity (e.g. bandwidth capability)

The attributes associated with each port may also include port specific cost information. Such cost information or criteria may be associated with the particular optimization goals or characteristics as described elsewhere herein.

The candidate port provided dynamic information c) may be characterized as status information from the selected candidate ports. Such information may also be used in the port selection process as second level inputs 908. Examples of information of type c) may include:

- Candidate port's device packet buffer availability (e.g., may be done with credits and may also referred to as receiver based flow control).
- Output port watermark information reflecting candidate port's device buffer availability by priority. In one embodiment, the foregoing priority may refer to the priority or class associated with a packet being routed. The priority may be specified in a field of a received transmissions. For example, in one embodiment, the priority may be specified a in a 2-bit field. A specified level of priority may indicate, for example, that a strict or strong ordering is performed in connection with packets of the indicated priority.
- Retry history for transmitter based flow control (e.g., many Retry requests may indicate lack of buffer availability).
- Explicit communicated state regarding the candidate port. (e.g. temporal performance information may be provided by the device connected to candidate port).

The internally provided dynamic information d) may be characterized as dynamic state information within the switch doing the routing. Such information may be used as second level input information 908 used in selection of the target output port from the set of candidates. Examples of switch-internally provided dynamic information may include:

- Port inoperative indication:
- Input port and output port queue state (e.g., number of packets queued, priority, class and age)
- Number of packets in the switch already targeted to a candidate port
- Temporal head-of-line blocking detection on input and output queues
- Past performance history for candidate port The pre-calculated information may be updated as represented by type information e) described above. Such information may include changes to the routing table information, fail-over policy, or temporary port usage restrictions. Notification of such changes may be accomplished either in-band over the fabric or out-of-band such as using a management port. For example, a packet may include management information which instructs the switch to change a static policy. The packet may be directed to a specific switch or may traverse path and change the static or precalculated information at each switch in the path. For example, such a packet may be used in an embodiment which includes static or pre-calculated information indicating which one of the multiple paths to use as a default or base path.

The foregoing provides for use of adaptive, dynamic routing by making routing decisions utilizing static routing information. It will be appreciated by those skilled in the art that a hardware implementation for all or a portion of the elements of FIG. 16 may use different components in number and type, such as AND and OR gates, in accordance with the various inputs and outputs for the particular embodiment.

Figure 17:
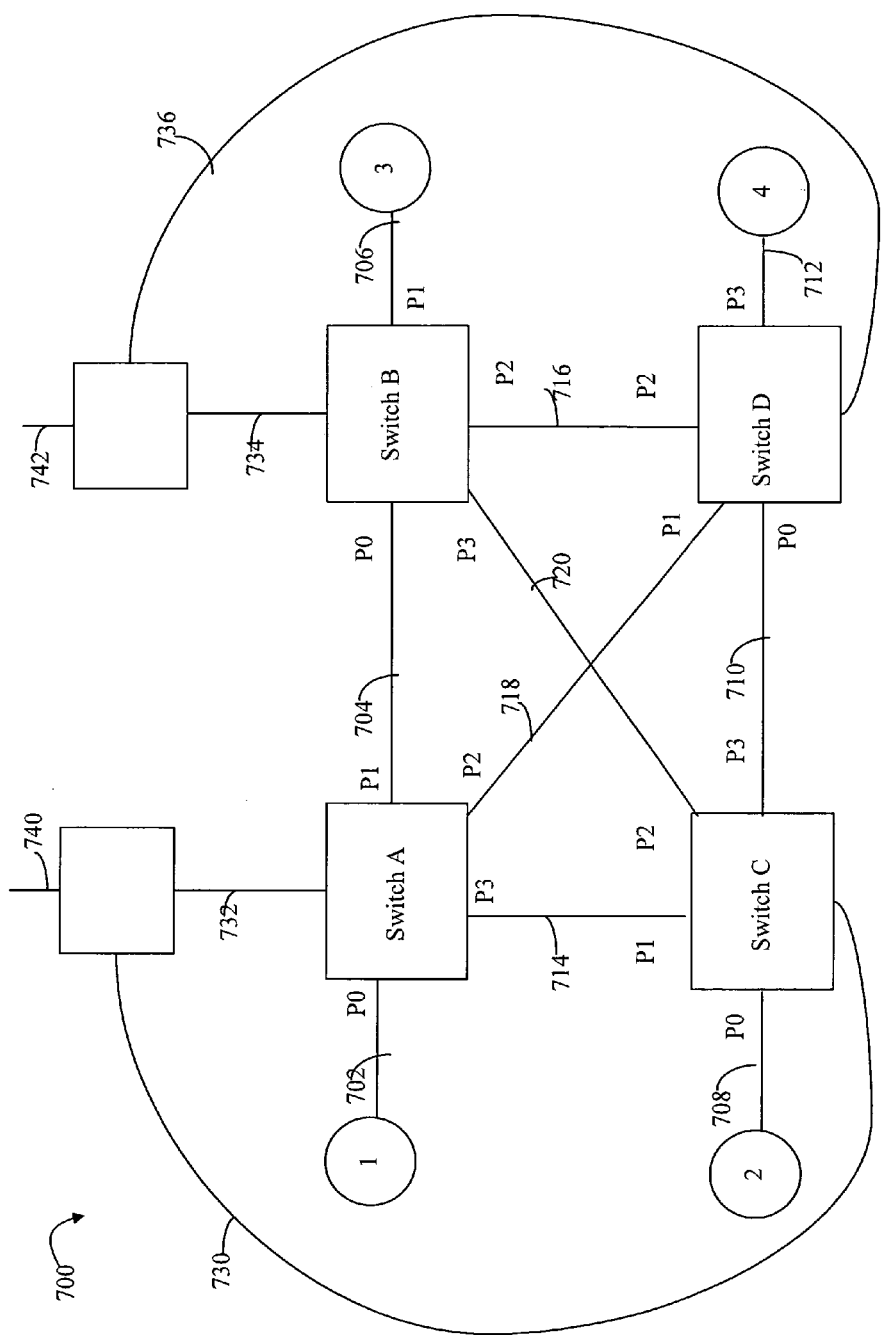
FIGS. 17-19 are example arrangements used in connection with illustrating metrics described herein.

Different techniques may be used in connection with measuring the quality or level of goodness associated with the routing maps selected for use in the router routing tables. A first metric, referred to herein as link utilization, may be used to evaluate each set of routing information. For example, the link utilization metric may be determined for the routing table information included in each of switches 1-4 as illustrated in connection with FIG. 12. In determining link utilization, a count is generated for each link, or graph edge, traversed when walking the paths for each source-destination pair of endpoints. For example with reference to FIG. 17, there are 10 edges or links. When traversing the paths from each pair of endpoints using one set of routing information stored in the routing tables, the number of times each link is traversed is totaled. The number of times each link is traversed may be recorded in a tabular form as follows:

| Link ID | link traversal count |
|---------|----------------------|
| 1       | 5                    |
| 2       | 6                    |
| .       | .                    |
| .       | .                    |
| .       | .                    |
| 10      | .                    |
|         | .                    |
|         | .                    |

Each link may have an associated Link ID as referenced in the table. Links that are topologically similar may be grouped together and the link utilization metric may be determined for all such links in a same category or type. For example, with reference to FIG. 17, the 10 links 702, 704, 706, 708, 710, 712, 714, 716, 718, and 720 may be included in a first category or grouping. Links 730, 732, 734 and 736 may be included in a second category and links 740 and 742 which connect to other components not illustrated may be included in a third category. Such groupings or categorizations may be made, for example, in accordance with a degree of fan-in or number of incoming links. For each category or grouping of topologically similar links, the standard deviation is determined. The standard deviation for a sample set of N values may be represented as the square root of the variance as:

$$\sqrt{\frac{1}{N}\sum_{i=1}^{N}(Xi-\overline{X})^2}$$

where Xi represents each $i^{th}$ link traversal count and $\overline{X}$ represents the mean of the link traversal counts. As the standard deviation of link traversal counts for a particular category approaches 0, the better the link utilization metric rating. Thus, one metric used to evaluate a set of routing information for routing tables is the link utilization metric just described as the standard deviation of the link traversal count for topologically similar links. The link utilization metric may be determined, for example, for each set of routing information associated with each alias bit setting as described herein.

A second metric may be used to collectively rate multiple sets of routing information. The second metric may be used to measure or rate the fault tolerance of multiple sets of alternate paths as may be associated with routing information for different alias bit settings. The second metric, referred to herein as the fault tolerance metric, measures a level of goodness of fault tolerance as may be associated with different routing sets. For example, a higher level of fault tolerance is associated with multiple sets of routing information if each set of routing information for a source-destination pair varies the links included in the path specified for the source-destination pair. The greater the duplication or overlap of path information included in each set of routing information for a source-destination pair, the lower the level of fault tolerance. The greater the degree of separation between the paths included in each route set, the greater the level of fault tolerance. Specification of the same path for the source-destination pair for each of the multiple sets of routing information provides zero fault tolerance since the same path is used in each set of routing information.

Figure 18:
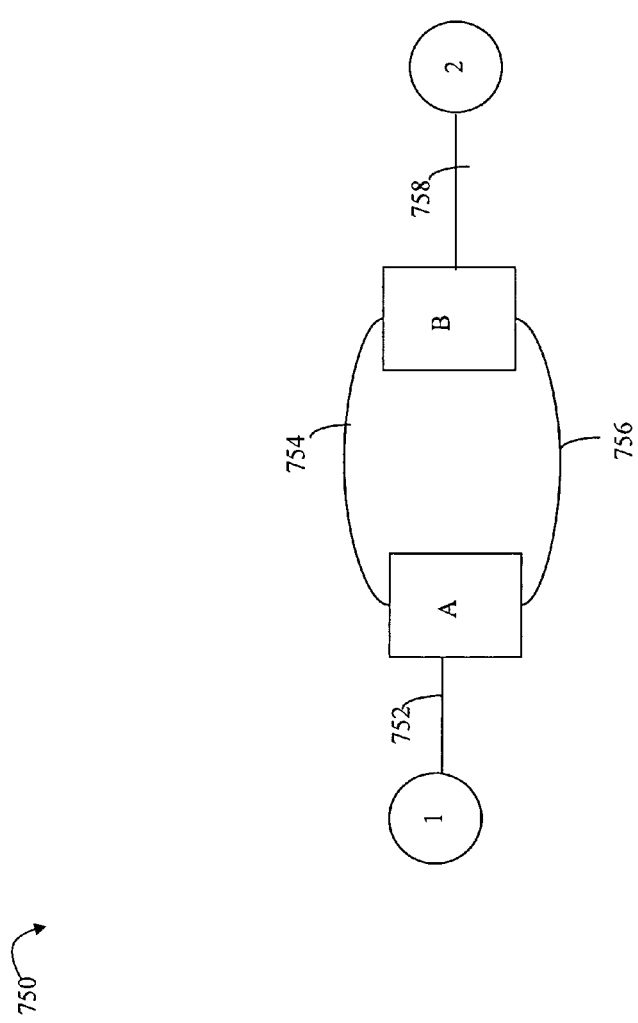

Referring now to FIG. 18, shown is an example 750 of a network configuration that will be used to illustrate the fault tolerance metric. In the example 750, there are 2 paths from endpoint 1 to endpoint 2. Path 1 traverses links 752, 754, and 758. Path 2 traverses link 752, 756, and 758. There are two sets of routing information with each set including one of the foregoing two paths. The fault tolerance metric measuring the degree of separation may be represented by the following equation:

$$1-(\text{number of common links/number of unique links in all paths for source-dstn pair})$$

Figure 19:
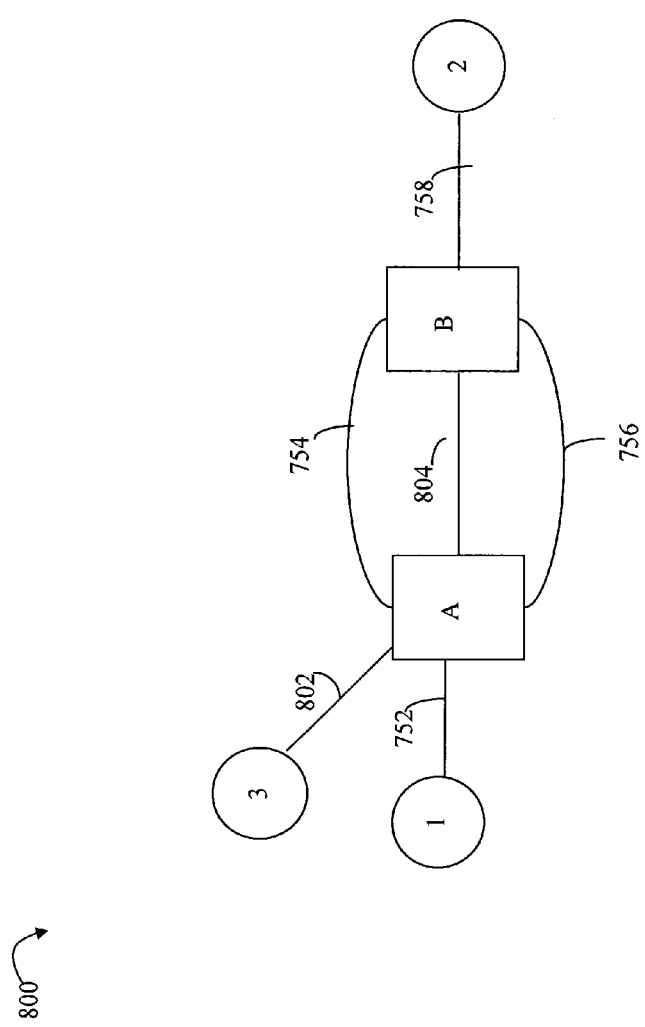

With reference to the foregoing example illustrated by FIG. 18, there are 2 common links (e.g., 752 and 758) included in both paths and there are 4 unique links in the paths for the source-destination pair 1-2 (e.g., 752, 754, 756 and 758). The fault tolerance metric in this instance is ½ or 0.5. This metric may be expanded for use with additional route sets such as by specifying a third path for use with the source destination pair 1-2. The fault tolerance metric may be extended for use with all source-destination pairs for a network as illustrated in FIG. 19. Note that FIG. 19 as compared to FIG. 18 includes additional links 802 and 804 with an additional endpoint 3. The set of source-destination pairs in the example 800 of FIG. 19 may be 1-2, 1-3 and 2-3. Assuming there is commutative routing (e.g., the same paths are used to transmit messages in either direction between each source-destination pair), the fault tolerance metric measuring the degree of separation may be represented as:

$$1-(\text{sum of common links for each source-destination pair in each route set})/(\text{sum of unique links occurring in all paths for each source-destination pair})$$

With reference to FIG. 19, following are the paths for each source-destination pair:

(1,2)=[752, 754, 758] [752, 804, 758] [752, 756, 758]
(1,3)=[752, 802]
(2, 3)=[758, 754, 802] [758, 804, 802] [758, 756, 802]

The foregoing may be used to define three sets of routing information. The first set of routing information specifies the first path from each of the foregoing paths for each source-destination pair. The second set of routing information specifies the second path for (1,2) and (2,3) and reuses the path for (1,3) since there is only one path for (1,3). The third set of routing information specifies the third paths for (1, 2) and (2,3) and reuses the path for (1,3). The common links used in determining the numerator portion of the fault tolerance metric for each source-destination pair are as follows in this example:

(1,2)=752, 758
(1,3)=752, 802
(2,3)=758, 802

Thus, there are 6 common links in this example. In the foregoing, a link may be characterized as common to each path for a source destination path.

It should be noted that an embodiment may also include a variation of the foregoing if a link is included in more than one, but not all, paths for a given pair. For example, if a link is in 2/3 paths for a given pair, 2/3 may be associated with the link rather than a value of "1" for those links in all paths, and otherwise indicating that the link is not considered in connection with the numerator portion of the fault tolerance metric. The unique links occurring in all paths for each source-destination pair are as follows for this example:

(1,2)=752, 754, 804, 756, 758
(1,3)=752, 802
(2,3)=758, 754, 802, 804, 756

Thus, there are 12 unique links in this example. The fault tolerance routing metric is:

$$1-(6/12)=0.5$$

Ideally, the ratio of sum of common links for each source-destination pair in each route set) to (sum of unique links occurring in all paths for each source-destination pair) is 1 so that the ideal fault tolerance routing metric is 0.

Note that the degree of separation as determined using the fault tolerance routing metric for the network illustrated in FIG. 19 is the same as the metric for the network illustrated in FIG. 18.

The foregoing metrics may be used in connection with evaluating routing information generated using the various techniques described herein with one or more sets of routing information. For metrics using more than set of routing information, the multiple sets of routing information may be generated using any one or more different adoption rule criteria described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining and using routing information for a plurality of components performing routing in a network comprising:
    determining which destinations are directly connected to each of said plurality of components, wherein each of said plurality of components is associated with one of a plurality of routing tables, each of said plurality of routing tables storing routing information in accordance with destinations in said network;
    storing, in accordance with said determining, cost information in said plurality of routing tables for each destination directly connected to one of said plurality of components;
    initializing the plurality of routing tables, the initializing including:
        performing, for each of said plurality of components:
            determining a set of neighboring components; and
            for each neighboring component, adopting routing information for a destination from the routing table of said each neighboring component in accordance with an adoption rule; and
        determining whether routing information in said plurality of routing tables has been modified, wherein said performing is repeated until said plurality of routing tables has not been modified as a result of said performing, wherein routing information in each of said plurality of routing tables generated as a result of repeating said performing until said plurality of routing tables has not been modified is a set of preconfigured routing information used as static routing information to initialize said each routing table prior to operation of said plurality of components to perform static routing of received transmissions, wherein static routing information included in a first of said plurality of routing tables associated with a first of said plurality of components includes for each destination at least two sets of said preconfigured routing information for route selection using an alias field included in an incoming packet, each of said at least two sets determined using an adoption rule specifying one or more criteria in accordance with a different optimization goal, wherein each of the at least two sets of the preconfigured routing information is not modified except by repeating the initializing of the plurality of routing tables; and routing, by said plurality of components using said plurality of routing tables, a transmission in said network, said network being a statically routed network including said plurality of components.

2. The method of claim 1, wherein an adoption rule used to determine a first of the at least two sets includes at least a first criterion indicating that first routing information for a first destination from said each neighboring component's routing table is adopted if the first routing information specifies a first path from said first component to said first destination having a first cost that is lower than a current cost associated with a second path from said first component to said first destination using second routing information for said first destination included in said first routing table associated with said first component.

3. The method of claim 2, wherein the cost is associated with path length.

4. The method of claim 2, wherein an adoption rule used to determine a second of the at least two sets includes said first criterion and a second criterion indicating that said first routing information from said each neighboring component's routing table is adopted if the first routing information specifies a new path from said first component to said first destination, said new path being an additional path from said first component to said first destination which is not already specified as an existing path in another of said at least two sets.

5. The method of claim 2, wherein the cost is associated with one or more characteristics including at least one of: bandwidth, latency, transmission error-rate, load balancing, link failure, and component failure.

6. The method of claim 1, wherein each different optimization goal associated with a different one of said at least two sets is selected from a plurality of optimization goals including latency optimization, bandwidth optimization, reliability optimization, and shortest path length optimization.

7. The method of claim 1, wherein said at least two sets of routing information include three sets of preconfigured routing information determined for said first component, a first of said three sets being optimized for characteristics including shortest path length, a second of said three sets being optimized for characteristics including bandwidth or reliability, and a third of said three sets being optimized for characteristics including latency.

8. The method of claim 1, wherein said static routing information included in said each routing table used by said each component to perform static routing is not modified unless altered by a network administrator and each of said at least two sets for said first component identifies an outgoing port of the first component to use when routing a transmission to a particular network destination that is external with respect to the first component.

9. A method for routing a received transmission at a component performing routing comprising:

determining a plurality of sets of routing information for routing said received transmission to a destination, each of said plurality of sets identifying a different path from said component to said destination, wherein said plurality of sets of routing information are included in preconfigured routing information of a routing table for the component for alternate route selection, said preconfigured routing information determined prior to operation of said component for routing and being static routing information which is not modified unless altered by a network administrator;

selecting, in accordance with selection criteria, a first of said plurality of sets of routing information, wherein said selection criteria comprises information included in a header of said received transmission, said information including first information of the header identifying said destination of said received transmission and second information including one or more other bits from an alias field of the header of said received transmission for specifying said first of said plurality of sets of routing information for said destination, said alias field having a size in accordance with a maximum number of sets of routing information included in said plurality; and routing said received transmission in a statically routed network using said first set of routing information.

10. The method of claim 9, wherein said component is a switch.

11. The method of claim 9, wherein said selection criteria uses one or more selection bits of said alias field, said selection bits include encoded information indicating one of a plurality of conditions, said plurality of conditions including: perform routing using said first set of routing information, perform routing using routing information other than said first set, and randomly select a set of routing information.

12. The method of claim 9, wherein said selecting is performed using at least one dynamic input that changes over time in accordance with said component or other characteristic of said network.

13. The method of claim 12, wherein said dynamic input indicates a transmission problem associated with a path specified by said one or more sets of routing information for said received transmission, and said selecting selects another path specified by said plurality of sets of routing information.

14. The method of claim 9, wherein said selection criteria is used by said component to make an adaptive routing decision regarding said received transmission.

15. A non-transitory computer-readable storage medium comprising code for determining and using routing information for a plurality of components performing routing in a network, the computer-readable storage medium comprising code for:

determining which destinations are directly connected to each of said plurality of components, wherein each of said plurality of components is associated with one of a plurality of routing tables, each of said plurality of routing tables storing routing information in accordance with destinations in said network;

storing, in accordance with said determining, cost information in said plurality of routing tables for each destination directly connected to one of said plurality of components;

initializing the plurality of routing tables, wherein the initializing includes:
performing, for each of said plurality of components:
determining a set of neighboring components; and
for each neighboring component, adopting routing information for a destination from the routing table of said each neighboring component in accordance with an adoption rule; and
determining whether routing information in said plurality of routing tables has been modified, wherein said performing is repeated until said plurality of routing tables has not been modified as a result of said performing, wherein routing information in each of said plurality of routing tables generated as a result of repeating said performing until said plurality of routing tables has not been modified is a set of preconfigured routing information used as static routing information to initialize said each routing table prior to operation of said plurality of components to perform static routing of received transmissions, wherein static routing information included in a first of said plurality of routing tables associated with a first of said plurality of components includes for each destination at least two sets of said preconfigured routing information for route selection using an alias field included in an incoming packet, each of said at least two sets determined using an adoption rule specifying one or more criteria in accordance with a different optimization goal, wherein each of the at least two sets of the preconfigured routing information is not modified except by repeating the initializing of the plurality of routing tables; and routing, by said plurality of components using said plurality of routing tables, a transmission in said network, said network being a statically routed network including said plurality of components.

16. The non-transitory computer readable storage medium of claim 15, wherein an adoption rule used to determine a first of the at least two sets includes at least a first criterion indicating that first routing information for a first destination from said each neighboring component's routing table is adopted if the first routing information specifies a first path from said first component to said first destination having a first cost that is lower than a current cost associated with a second path from said first component to said first destination using second routing information for said first destination included in said first routing table associated with said first component.

17. The non-transitory computer readable storage medium of claim 16, wherein an adoption rule used to determine a second of the at least two sets includes said first criterion and a second criterion indicating that said first routing information from said each neighboring component's routing table is adopted if the first routing information specifies a new path from said first component to said first destination, said new path being an additional path from said first component to said first destination which is not already specified as an existing path in another of said at least two sets.

18. The non-transitory computer readable storage medium of claim 16, wherein the cost is associated with one or more characteristics including at least one of: path length, bandwidth, latency, transmission error-rate, load balancing, link failure, and component failure.

19. The non-transitory computer readable storage medium of claim 15, wherein at least one of said plurality of components is a switch.

20. A method for routing a received transmission at a component performing routing, comprising:

determining a plurality of sets of routing information for routing said received transmission to a destination, each of said plurality of sets identifying a different path from said component to said destination, wherein said plurality of sets of routing information are included in preconfigured routing information of a routing table for the component, said preconfigured routing information determined prior to operation of said component for routing and being static routing information which is not modified unless altered by a network administrator;

selecting, in accordance with selection criteria, a first of said plurality of sets of routing information, wherein said selection criteria comprises information included in a header of said received transmission, said information including first information of the header identifying said destination of said received transmission and second information including one or more other bits from an alias field of the header of said received transmission, said alias field having a size in accordance with a maximum number of sets of routing information included in said plurality; and routing said received transmission in a statically routed network using said first set of routing information, wherein said received transmission includes a source address field and a destination address field, said source address field comprising a first set of one or more alias bits, said destination address field comprising a second set of one or more alias bits, wherein, if said first set of alias bits are equal to said second set of alias bits, said component routes received transmissions which are packets for a same message on a same selected path, and otherwise, if not equal, relaxed ordering is indicated in that said component may route received transmissions which are packets for a same message on different paths.

* * * * *